US009323917B2

(12) United States Patent
Araki

(10) Patent No.: US 9,323,917 B2
(45) **Date of Patent: *Apr. 26, 2016**

(54) INFORMATION PROCESSING SYSTEM, INFORMATION PROCESSOR, IMAGE FORMING APPARATUS, AND INFORMATION PROCESSING METHOD

(71) Applicant: Ryoji Araki, Fukuoka (JP)

(72) Inventor: Ryoji Araki, Fukuoka (JP)

(73) Assignee: RICOH COMPANY, LTD., Tokyo (JP)

(*) Notice: Subject to any disclaimer, the term of this patent is extended or adjusted under 35 U.S.C. 154(b) by 14 days.

This patent is subject to a terminal disclaimer.

(21) Appl. No.: 13/894,147

(22) Filed: May 14, 2013

(65) Prior Publication Data

US 2013/0254903 A1 Sep. 26, 2013

Related U.S. Application Data

(63) Continuation of application No. 12/019,220, filed on Jan. 24, 2008, now Pat. No. 8,474,051.

(30) Foreign Application Priority Data

Feb. 28, 2007 (JP) ................................ 2007-050667
Feb. 28, 2007 (JP) ................................ 2007-050668
Nov. 14, 2007 (JP) ................................ 2007-295661
Nov. 14, 2007 (JP) ................................ 2007-295662

(51) Int. Cl.
*H04N 7/16* (2011.01)
*G06F 21/44* (2013.01)
*G06F 21/10* (2013.01)

(52) U.S. Cl.
CPC ............. *G06F 21/44* (2013.01); *G06F 21/105* (2013.01)

(58) Field of Classification Search
CPC ..... G06F 21/44; G06F 21/105; G06F 21/123; G06F 21/34; G06F 2221/2129; G06F 21/316; G06F 21/32; G06F 21/33; G06F 21/335
USPC ........... 726/26-33; 705/50-52; 380/200-202, 380/231, 233
See application file for complete search history.

(56) References Cited

U.S. PATENT DOCUMENTS 7,222,106 B2 5/2007 Block et al.
7,530,117 B2 * 5/2009 Tanaka et al. .................. 726/31

(Continued)

FOREIGN PATENT DOCUMENTS

EP 1 486 854 A2 12/2004
EP 1 486 854 A3 12/2004

(Continued)

OTHER PUBLICATIONS

Office Action issued Sep. 10, 2013, in Japanese Patent Application No. 2012-168865.

(Continued)

*Primary Examiner* — Nirav B Patel
(74) *Attorney, Agent, or Firm* — Oblon, McClelland, Maier & Neustadt, L.L.P.

(57) ABSTRACT

An information processing system including multiple apparatuses capable of executing one or more applications and an information processor connected to the apparatuses through a first network is disclosed. The information processing system includes a license status information obtaining part configured to obtain the license status information of the applications installed in each of the apparatuses from the corresponding apparatuses through the first network, a license data obtaining part configured to obtain license data authorizing usage of the applications from a computer connected through a second network based on the license status information, and a license data delivery part configured to deliver the license data to each of the apparatuses.

18 Claims, 34 Drawing Sheets

(56) References Cited

U.S. PATENT DOCUMENTS

| | | | | |
|---|---|---|---|---|
| 7,590,856 | B2 * | 9/2009 | Morino et al. | 713/182 |
| 7,752,138 | B1 | 7/2010 | Dean et al. | |
| 2001/0011253 | A1 * | 8/2001 | Coley et al. | 705/59 |
| 2001/0013099 | A1 | 8/2001 | Haruki | |
| 2002/0091645 | A1 * | 7/2002 | Tohyama | 705/59 |
| 2003/0033255 | A1 | 2/2003 | Burton et al. | |
| 2003/0135756 | A1 | 7/2003 | Verma | |
| 2003/0149671 | A1 | 8/2003 | Yamamoto et al. | |
| 2004/0117784 | A1 | 6/2004 | Endoh | |
| 2004/0148525 | A1 * | 7/2004 | Aida et al. | 713/201 |
| 2004/0205261 | A1 | 10/2004 | Osada | |
| 2004/0254889 | A1 | 12/2004 | Tanaka et al. | |
| 2005/0091544 | A1 | 4/2005 | Lambert | |
| 2005/0108566 | A1 | 5/2005 | Minogue et al. | |
| 2005/0132347 | A1 | 6/2005 | Harper et al. | |
| 2005/0240766 | A1 * | 10/2005 | Ishige | 713/175 |
| 2006/0031222 | A1 | 2/2006 | Hannsmann | |
| 2006/0106725 | A1 | 5/2006 | Finley et al. | |
| 2006/0200420 | A1 | 9/2006 | Osada | |
| 2006/0256370 | A1 | 11/2006 | Murakawa | |
| 2007/0130298 | A1 | 6/2007 | Matsuhara et al. | |
| 2007/0150967 | A1 * | 6/2007 | Takahashi | 726/31 |
| 2007/0179899 | A1 | 8/2007 | Hase et al. | |
| 2007/0284437 | A1 * | 12/2007 | Yamamoto | 235/380 |
| 2009/0228982 | A1 * | 9/2009 | Kobayashi | 726/26 |

FOREIGN PATENT DOCUMENTS

| | | | |
|---|---|---|---|
| JP | 2001-312325 | | 11/2001 |
| JP | 2002-123328 | | 4/2002 |
| JP | 2002-297255 | A | 10/2002 |
| JP | 2003-256062 | | 9/2003 |
| JP | 2004-139149 | | 5/2004 |
| JP | 2004-185498 | | 7/2004 |
| JP | 2005-4449 | A | 1/2005 |
| JP | 2005-250845 | A | 9/2005 |
| JP | 2005-269619 | | 9/2005 |
| JP | 2006-18744 | | 1/2006 |
| JP | 2006-59163 | A | 3/2006 |
| JP | 2006-514788 | | 5/2006 |
| WO | WO 2004/036409 | A1 | 4/2004 |

OTHER PUBLICATIONS

Office Action issued in Japanese Application No. 2012-15179 on Apr. 16, 2013.

Office Action issued in Japanese Application No. 2012-15180 on Apr. 16, 2013.

"Operations Guide", Microsoft Systems, Management Server 2003, (Scalable Management for Windows-based Systems), XP002439673, Retrieved from the interenet: URL: http://www.e-consultancy.com/knowledge/whitepapers/88549/operations-guide-microsoft-systems-management-server-2003--scalable-management-for-windows--basedsystems.html>, Dec. 31, 2003, 69 pages.

Office Action mailed Feb. 7, 2012, in Japanese Patent Application No. 2007-295661, filed Nov. 14, 2007.

* cited by examiner

| PRODUCT KEY | APPLICATION ID | FUNCTION | EXPIRATION DATE | PRICE |
|---|---|---|---|---|
| AAAAAAAA | 00000001 | PRINT | 2007/12/31 | 1000 |
| AAAAAAAB | 00000001 | PRINT,SCAN | 2007/12/31 | 1500 |
| BBBBBBBB | 00000001 | ALL | 2008/12/31 | 1500 |
| CCCCCCCC | 00000002 | FAX | 2007/12/31 | 500 |
| DDDDDDDD | 00000003 | ALL | 2007/12/31 | 300 |

| PRODUCT KEY | MACHINE NUMBER | LICENSE CODE |
|---|---|---|
| AAAAAAAA | 11111111 | ABCDEFGH |
| AAAAAAAA | 11111112 | ABCDEFGG |
| AAAAAAAA | 11111113 | ABCDEFGJ |
| AAAAAAAA | 11111114 | ABCDEFGK |
| AAAAAAAA | 11111115 | ABCDEFGL |
| CCCCCCCC | 11111111 | ABCDEFGM |
| DDDDDDDD | 11111111 | ABCDEFIH |
| DDDDDDDD | 11111113 | ABCDEFII |

| PRODUCT KEY | APPLICATION ID | FUNCTION | EXPIRATION DATE | PRICE |
|---|---|---|---|---|
| AAAAAAAA | 00000001 | PRINT | 2007/12/31 | 1000 |
| AAAAAAAB | 00000001 | PRINT,SCAN | 2007/12/31 | 1500 |
| BBBBBBBB | 00000001 | ALL | 2008/12/31 | 1500 |
| CCCCCCCC | 00000002 | ALL | 2007/12/31 | 500 |
| DDDDDDDD | 00000003 | ALL | 2007/12/31 | 300 |
| EEEEEEEE | 00000004 | ALL | 2008/12/31 | 600 |

FIG.11

| MFP IP ADDRESS | MFP MACHINE NUMBER |
|---|---|
| 111.111.111.111 | 11111111 |
| 111.111.111.112 | 11111112 |
| 111.111.111.113 | 11111113 |
| 111.111.111.114 | 11111114 |
| | |

| APPLICATION ID | LICENSE CODE |
|---|---|
| 00000001 | ABCDEFGH |
| 00000002 | |

FIG.15

| MFP IP ADDRESS | APPLICATION ID | LICENSE CODE |
|---|---|---|
| 111.111.111.111 | 00000001 | ABCDEFGH |
| 111.111.111.111 | 00000002 | |
| 111.111.111.112 | 00000001 | |

FIG.20

| APPLICATION ID | MACHINE NUMBER | FUNCTION | EXPIRATION DATE |
| --- | --- | --- | --- |

| PRODUCT KEY | MFP MACHINE NUMBER | LICENSE CODE |
|---|---|---|
| AAAAAAAA | 11111111 | ABCDEFGH |
| AAAAAAAA | 11111112 | ABCDEFGG |
| AAAAAAAA | 11111113 | ABCDEFGJ |
| AAAAAAAA | 11111114 | ABCDEFGK |
| AAAAAAAA | 11111115 | ABCDEFGL |
| CCCCCCCC | 11111111 | ABCDEFGM |
| DDDDDDDD | 11111111 | ABCDEFIH |
| DDDDDDDD | 11111113 | ABCDEFII |
| CCCCCCCC | 11111111 | ABCDEFGI |
| BBBBBBBB | 11111112 | ABCDEFHH |

FIG.22

| MFP IP ADDRESS | APPLICATION ID | LICENSE CODE |
|---|---|---|
| 111.111.111.111 | 00000001 | ABCDEFGH |
| 111.111.111.111 | 00000002 | ABCDEFGI |
| 111.111.111.112 | 00000001 | ABCDEFHH |

| APPLICATION ID | LICENSE CODE | DEACTIVATION FLAG |
|---|---|---|
| 00000001 | ABCDEFGH | ○ |
| 00000002 | | |

| FILE | | | | | |
|---|---|---|---|---|---|
| IP ADDRESS | MACHINE NUMBER | APPLICATION ID | FUNCTION | LICENSE CODE | STATUS | PRICE |
| 111.111.111.111 | 11111111 | 00000001 | PRINT,SCAN | ABCDEFGH | TRANSMITTED | 1,000 |
| 111.111.111.111 | 11111111 | 00000002 | FAX | ABCDEFGI | TRANSMITTED | 500 |
| 111.111.111.112 | 11111112 | 00000001 | ALL | ABCDEFHH | TRANSMITTED | 700 |

150a

151a

155 MACHINE-BY-MACHINE SUM

156 APPLICATION-BY-APPLICATION SUM

INFORMATION PROCESSING SYSTEM, INFORMATION PROCESSOR, IMAGE FORMING APPARATUS, AND INFORMATION PROCESSING METHOD

CROSS-REFERENCE TO RELATED APPLICATIONS

This application is a continuation of U.S. application Ser. No. 12/019,220, filed Jan. 24, 2008, which is based upon and claims the benefit of priority from prior Japanese Patent Application Nos. 2007-050667, filed Feb. 28, 2007, 2007-050668, filed Feb. 28, 2007, 2007-295661, filed Nov. 14, 2007, and 2007-295662 filed Nov. 14, 2007. The entire contents of each of the above-listed applications are incorporated herein by reference.

BACKGROUND OF THE INVENTION

1. Field of the Invention

The present invention relates generally to information processing systems, information processors, image forming apparatuses, and information processing methods, and more particularly to an information processing system, an information processor, an image forming apparatus, and an information processing method that set up a license for an application to be executed in an apparatus.

2. Description of the Related Art

In these years, in some image forming apparatuses, mainly of those called multi-function machines, it is possible to develop and install a new application after their shipment. (See, for example, Japanese Laid-Open Patent Application No. 2005-269619.) The mode of usage of such an application is so diversified that some users may wish to use the application only for a predetermined period of time while others may wish to use only a particular one or more of all its functions. If it is possible to set up a license for the application on the image forming apparatus in accordance with the mode of usage of each user, this not only is convenient for users but also allows the seller of the application to expect to have more business chances.

However, there is a problem in that it is a lot of trouble to do such a setup on each image forming apparatus in a user environment where multiple image forming apparatuses are used. This is believed to be a problem not only for image forming apparatuses but common to apparatuses capable of executing an application.

SUMMARY OF THE INVENTION

According to one embodiment of the present invention, there are provided an information processing system, an information processor, an image forming apparatus, and an information processing method capable of setting up a license for an application on multiple apparatuses with efficiency.

According to one embodiment of the present invention, there is provided an information processing system including a plurality of apparatuses capable of executing one or more applications and an information processor connected to the apparatuses through a first network, the information processing system including a license status information obtaining part configured to obtain license status information of the applications installed in each of the apparatuses from the corresponding apparatuses through the first network; a license data obtaining part configured to obtain license data authorizing usage of the applications from a computer connected through a second network based on the license status information, and a license data delivery part configured to deliver the license data to each of the apparatuses.

According to one embodiment of the present invention, there is provided an information processing method executed by a plurality of apparatuses capable of executing one or more applications and an information processor connected to the apparatuses through a first network, the information processing method including the steps of (a) obtaining license status information of the applications installed in each of the apparatuses from the corresponding apparatuses through the first network, (b) obtaining license data authorizing usage of the applications from a computer connected through a second network based on the license status information, and (c) delivering the license data to each of the apparatuses.

According to one embodiment of the present invention, there is provided an image forming apparatus capable of executing one or more applications, the image forming apparatus including a license status information provision part configured to transmit license status information for the applications in response to a request to obtain the license status information received through a network; a license reception part configured to receive license data according to the license status information through the network and store the received license data in a storage unit; and a determination part configured to determine whether it is authorized to use the applications based on the stored license data.

According to one embodiment of the present invention, there is provided an information processor including a license status information obtaining part configured to obtain license status information of one or more applications installed in each of a plurality of apparatuses capable of executing the applications from each of the apparatuses through a first network; a license data obtaining part configured to obtain license data authorizing usage of the applications from a computer connected through a second network based on the license status information; and a license data delivery part configured to deliver the license data to each of the apparatuses.

According to one embodiment of the present invention, there is provided an information processing method executed by an image forming apparatus capable of executing one or more applications, the image processing method including the steps of (a) transmitting license status information for the applications in response to a request to obtain the license status information received through a network; (b) receiving license data according to the license status information through the network and storing the received license data in a storage unit; and (c) determining whether it is authorized to use the applications based on the stored license data.

According to one embodiment of the present invention, there is provided a computer-executable information processing method, including the steps of (a) obtaining license status information of one or more applications installed in each of a plurality of apparatuses capable of executing the applications from each of the apparatuses through a first network; (b) obtaining license data authorizing usage of the applications from a computer connected through a second network based on the license status information; and (c) delivering the license data to each of the apparatuses.

According to the above-described information processing system, image forming apparatus, image processor, and information processing methods, it is possible to set up a license for an application on multiple apparatuses with efficiency.

BRIEF DESCRIPTION OF THE DRAWINGS

Other objects, features and advantages of the present invention will become more apparent from the following detailed description when read in conjunction with the accompanying drawings, in which:

FIG. 3 shows an example of an application license table forming a license DB according to the embodiment of the present invention;

FIG. 4 shows an example of a license issuance table forming the license DB according to the embodiment of the present invention;

FIG. 9 shows an example of the application license table updated by the registration of a new license according to the embodiment of the present invention;

FIG. 11 shows an example of an apparatus list according to the embodiment of the present invention;

FIG. 14 shows a configuration of information stored in a license file according to the embodiment of the present invention;

FIG. 15 shows a configuration of license status information retained in the license obtaining apparatus according to the embodiment of the present invention;

FIG. 20 is a diagram showing a configuration of a license code according to the embodiment of the present invention;

FIG. 21 shows the license issuance table in which a new license is recorded according to the embodiment of the present invention;

FIG. 22 shows the updated license status information according to the embodiment of the present invention;

FIG. 29 shows an example of the license file containing a deactivation flag according to the embodiment of the present invention;

DETAILED DESCRIPTION OF THE PREFERRED EMBODIMENTS

A description is given below, with reference to the accompanying drawings, of an embodiment of the present invention.

Figure 1:
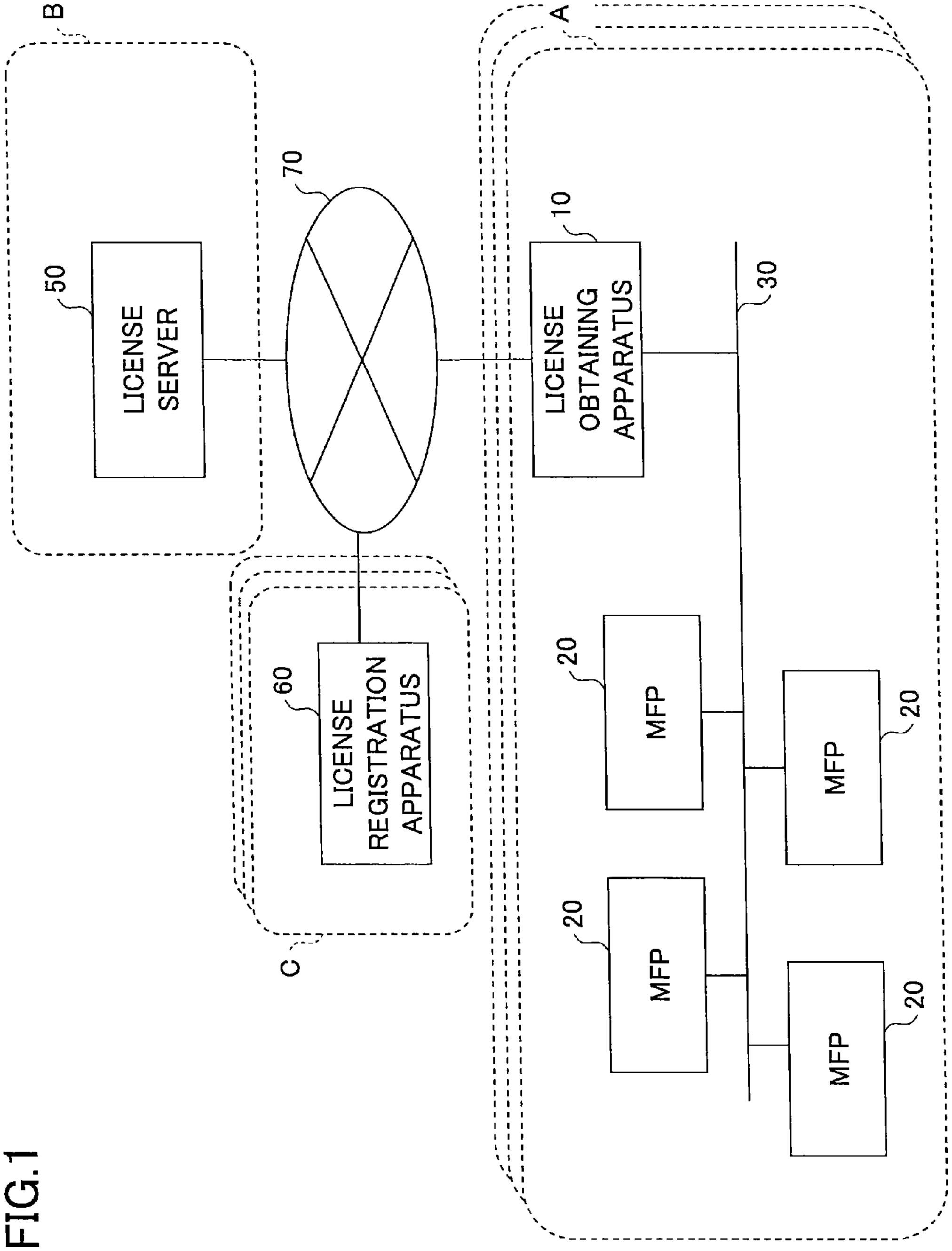
FIG. 1 is a diagram showing a configuration of a license management system according to an embodiment of the present invention.

FIG. 1 is a diagram showing a configuration of a license management system according to the embodiment of the present invention.

Referring to FIG. 1, the license management system includes a user site A, a license issuance site B, and a license registration site C.

The user site A is the user environment of image forming apparatuses, to which the office of a user may correspond. Accordingly, there may be multiple user sites A for corresponding users of image forming apparatuses. The user site A includes a license obtaining apparatus 10 and at least one MFP (Multifunction Peripheral) 20, which are connected via a network 30 (either wired or wireless) such as a LAN (Local Area Network). In general, the MFP 20 is an image forming apparatus called multi-function machine. That is, the MFP 20 has hardware for implementing multiple functions such as a copying function, a printing function, a scanning function, and a facsimile function provided in a single enclosure. Various applications using these functions may be installed in the MFP 20. However, the image forming apparatus to which the present invention is applied is not limited to the multi-function machine, and may be any image forming apparatus that can at least have an application installed therein and execute it. Accordingly, it may be an image forming apparatus that implements a single function such as copying, facsimile, printing, or scanning.

The license obtaining apparatus 10 is a computer such as a PC (Personal Computer) so as to collectively obtain licenses for (authority to use) applications that operate in the MFP 20 in the user site A. That is, various applications installed in the MFP 20 are made usable or available by the corresponding licenses obtained by the license obtaining apparatus 10.

The license issuance site B is an environment that issues licenses for the applications of the MFP 20 used in the user site A to the user site A. For example, the license issuance site B is operated by the manufacturer of the MFP 20. A license server 50 is provided in the license issuance site B. The license server 50 is a computer that generates and issues licenses.

The license registration site C is an environment that requests the license issuance site B to register (record) license information including information on applications managed with licenses and information on the licenses for the applications. For example, the vender of each application corresponds to the license registration site C. Accordingly, there may be multiple license registration sites C for corresponding application venders. A license registration apparatus 60 is provided in the license registration site C. The license registration apparatus 60 is a computer such as a PC for entering a request to register (record) the license information.

The license obtaining apparatus 10, the license server 50, and the license registration apparatus 60 are connected via a wide area network 70 such as the Internet.

A description is given in more detail of the license server 50, the license obtaining apparatus 10, and the MFP 20.

Figure 2:
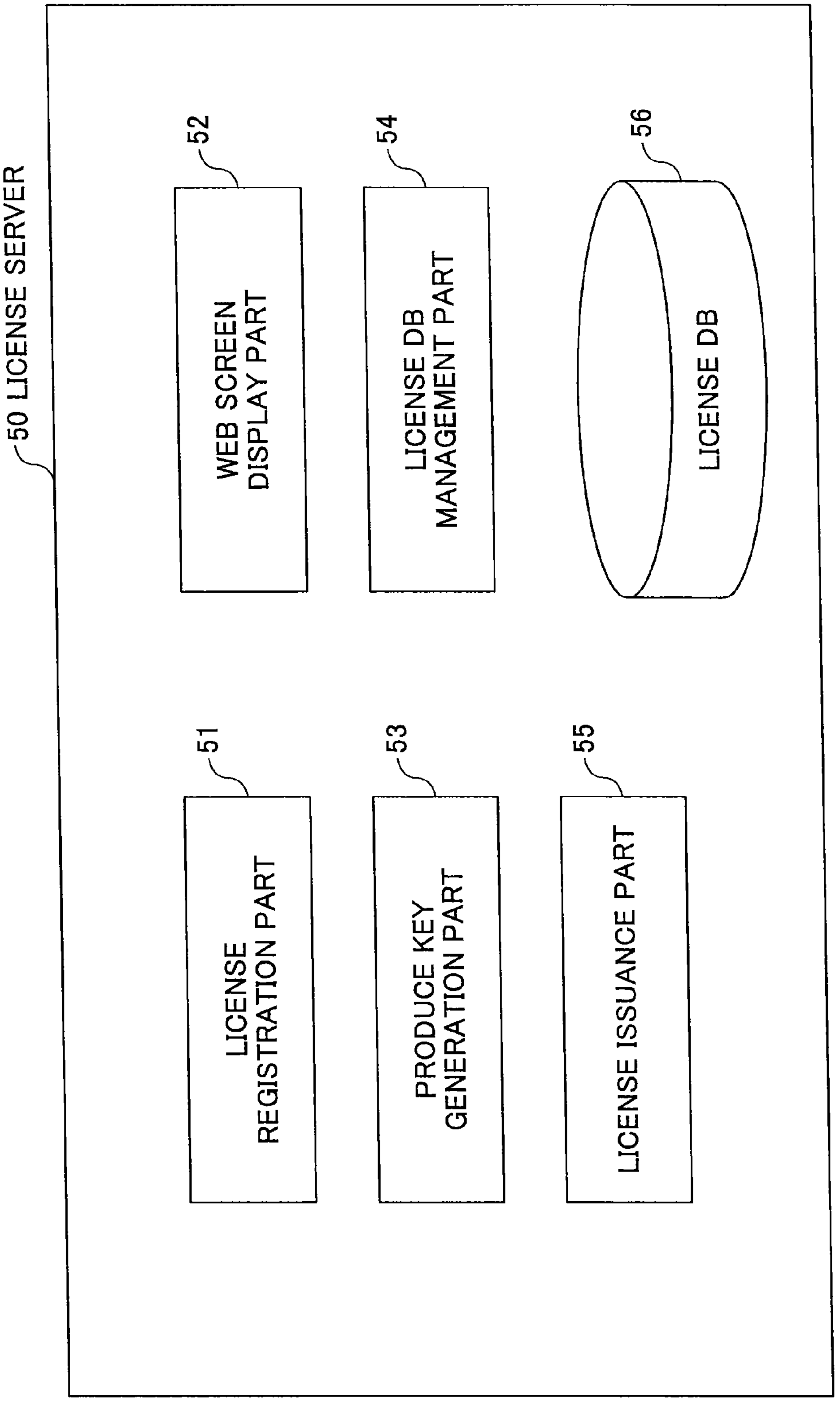
FIG. 2 is a block diagram showing a functional configuration of a license server according to the embodiment of the present invention.

FIG. 2 is a block diagram showing a functional configuration of the license server 50.

Referring to FIG. 2, the license server 50 includes a license registration part 51, a Web screen display part 52, a product key generation part 53, a license DB (database) management part 54, a license issuance part 55, and a license DB 56.

The license DB 56 is constructed in a storage unit of the license server 50 in order to manage license-related information, and includes, for example, an application license table and a license issuance table.

FIG. 3 shows an example of the application license table forming the license DB 56.

Referring to FIG. 3, an application license table 561 manages information on one or more licenses for an SDK application 24 (FIG. 6) registered as targets of sale, and manages a product key, an application ID, a function, an expiration date, and a price license by license.

The product key is identification information assigned on the basis of the license (type) of an application. That is, even the same application is assigned different product keys for different available functions or expiration dates (that is, different license types). As described below, the license type is specified by the product key at the time of purchasing a license.

The application ID is identification information assigned uniquely to each application.

The function indicates one or more of the functions of an application identified by the application ID which one or more are available under the license. For example, "ALL" indicates that all functions are available.

The expiration date indicates the date at which the license expires. The price indicates the price of the license.

When multiple licenses are defined for the same application, no inclusion relation is necessary between the available functions of the licenses. That is, licenses under which totally different functions are available may be registered.

Further, FIG. 4 shows an example of the license issuance table forming the license DB 56. Referring to FIG. 4, a license issuance table 562 is for managing purchased (registered) licenses, and manages a product key, a machine number, and a license code on a purchased license basis.

The machine number is identification information assigned to each MFP 20, and uniquely identifies the corresponding MFP 20. The license code is data generated for each purchased license. As is clear from FIG. 4, one license of the single SDK application 24 is issued to a particular MFP 20. That is, under one license, the SDK application 24 corresponding to the license is available only in the MFP 20 corresponding to the license. The license code authorizes the usage of the SDK application 24, while it is used as data for restricting the availability of the SDK application 24.

Referring back to FIG. 2, the license registration part 51 controls processing for recording information on a new license in the application license table 561 in response to a license registration request (a request to have a license registered) from the license registration site C. The Web screen display part 52 provides the license registration apparatus 60 with a Web page for entering a license registration instruction (an instruction to register a license). The product key generation part 53 generates, in response to the license registration request, a product key for the license. The license DB management part 54 manages the license DB 56. The license issuance part 55 controls processing for issuing a license in response to a request from the user site A to have the license issued (a request to purchase the license).

Figure 5:
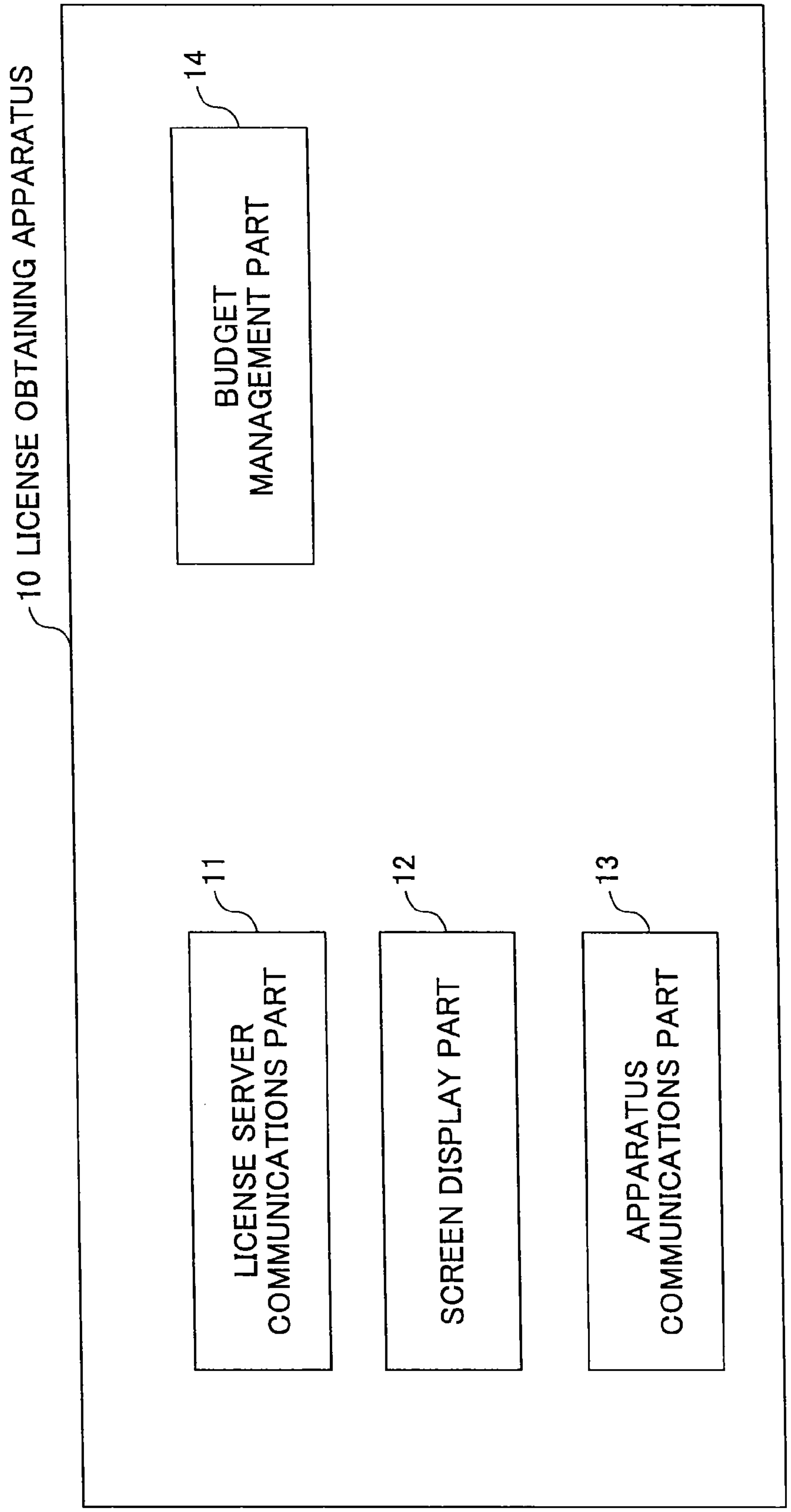
FIG. 5 is a block diagram showing a functional configuration of a license obtaining apparatus according to the embodiment of the present invention.

FIG. 5 is a block diagram showing a functional configuration of the license obtaining apparatus 10.

Referring to FIG. 5, the license obtaining apparatus 10 includes a license server communications part 11, a screen display part 12, an apparatus communications part 13, and a budget management part 14.

The license server communications part 11 controls communications with the license server 50 and processing for obtaining a license (license code) from the license server 50. The screen display part 12 causes various information items to be provided to a user at the time of the purchase of a license to be displayed on a display unit. The apparatus communications part 13 controls acquisition of various information items from the MFP 20 and delivery of a license code to the MFP 20. The budget management part 14 helps to exercise budget management associated with the purchase of a license.

Figure 6:
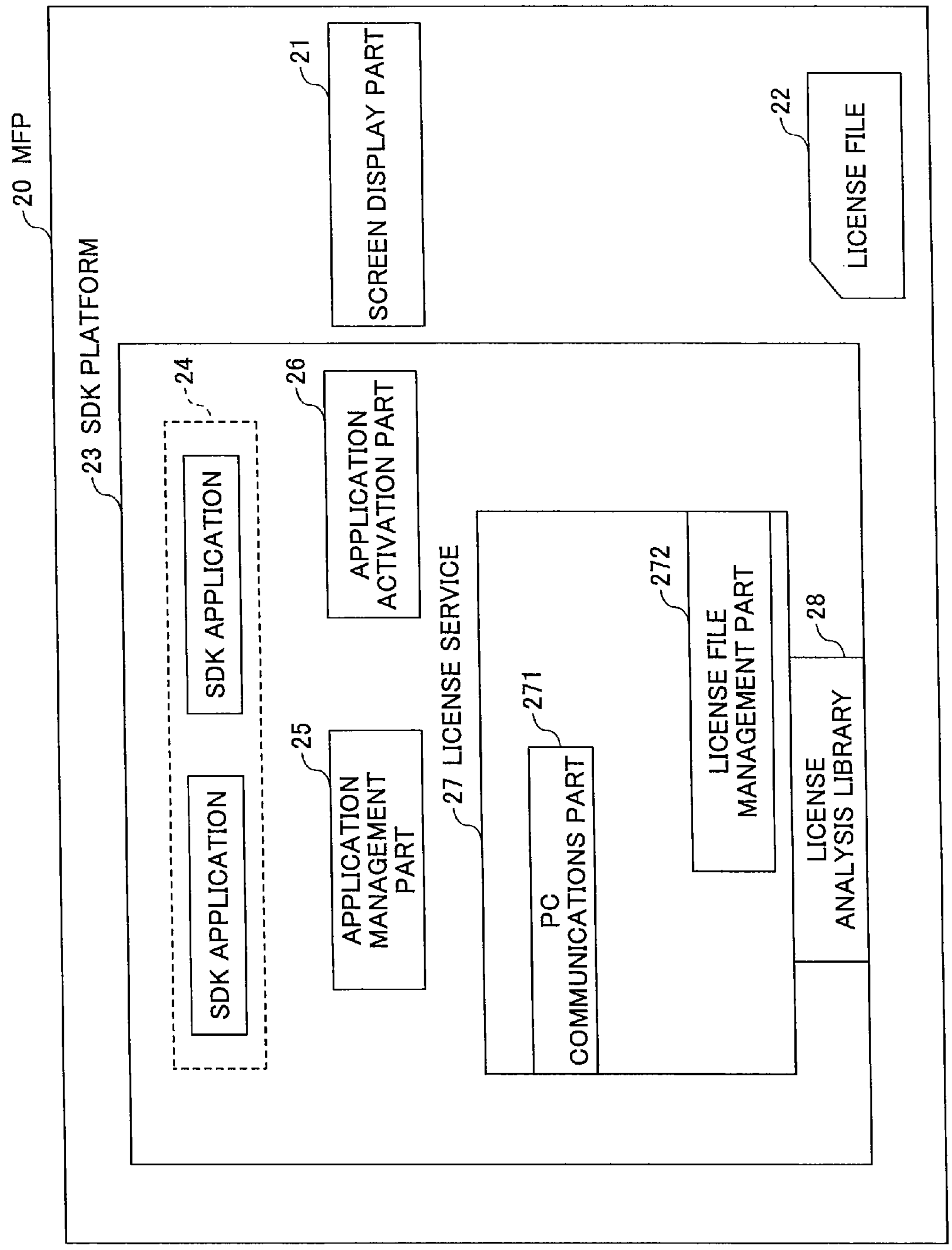
FIG. 6 is a block diagram showing a functional configuration of an MFP according to the embodiment of the present invention.

FIG. 6 is a block diagram showing a functional configuration of the MFP 20.

Referring to FIG. 6, the MFP 20 includes a screen display part 21, a license file 22, an SDK platform 23, the SDK application 24 that operates on the SDK platform 23, an application management part 25, an application activation part 26, a license service 27, and a license analysis library 28.

The license file 22 stores a license code delivered from the license obtaining apparatus 10.

The SDK platform 23 is an environment for executing an application developed using an SDK (Software Development Kit) dedicated to the MFP 20. The MFP 20, after its shipment, can have an application developed using the dedicated SDK newly installed therein and execute it.

The SDK application 24 is developed using the SDK. Multiple SDK applications 24 may be installed in the single MFP 20.

The application management part 25 manages information on the SDK application 24 installed in the MFP 20. Further, the application activation part 26 controls activation of the SDK application 24 based on the license code contained in the license file 22.

The license service 27 mainly performs processing for receiving the license code from the license obtaining apparatus 10. The license service 27 includes a PC communications part 271 and a license file management part 272. The license file management part 272 performs processing such as controlling access to the license file 22.

The license analysis library 28 decrypts and decodes an encoded and encrypted license code. Further, the license analysis library 28 determines whether the MFP 20 has a license for the SDK application 24 determined to be activated.

Next, a description is given of the hardware configuration of the license obtaining apparatus 10.

Figure 7:
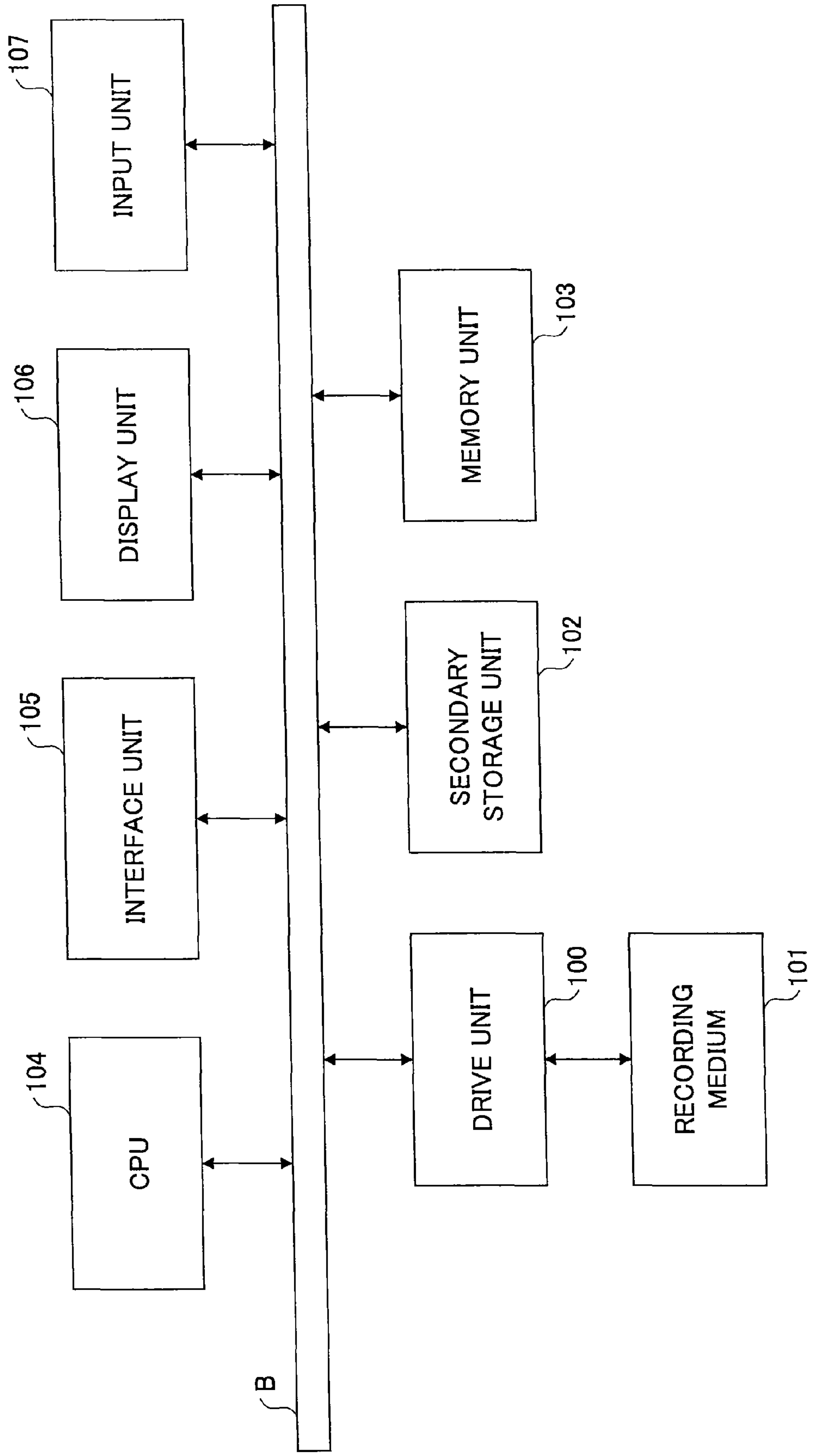
FIG. 7 is a block diagram showing a hardware configuration of the license obtaining apparatus according to the embodiment of the present invention.

FIG. 7 is a block diagram showing a hardware configuration of the license obtaining apparatus 10 according to the embodiment of the present invention.

Referring to FIG. 7, the license obtaining apparatus 10 includes a drive unit 100, a secondary storage unit 102, a memory unit 103, a CPU 104, an interface unit 105, a display unit 106, and an input unit 107.

A program that implements processing in the license obtaining apparatus 10 is provided by a recording medium 101 such as a CD-ROM. When the drive unit 100 is loaded with the recording medium 101 having the program recorded thereon, the program is installed in the secondary storage unit 102 from the recording medium 101 through the drive unit 100. The secondary storage unit 102 stores the installed program as well as necessary files and data.

The memory unit 103 reads out the program from the secondary storage unit 102 and stores the program in response to an instruction to activate the program.

The CPU 104 implements a function related to the license obtaining apparatus 10 in accordance with the program contained in the memory unit 103.

The interface unit 105 is used for connecting to the network 30 of FIG. 1. The display unit 106 displays a GUI (Graphical User Interface) according to the program. The input unit 107 includes a keyboard and a mouse, and is used for entering various instructions for operations.

The program does not always have to be installed from the recording medium 101, and may be downloaded from another computer via a network.

The license server 50 may have the same hardware configuration as the license obtaining apparatus 10. However, in the case of operating the license server 50 via the network, the display unit 106 and the input unit 107 are not always necessary. Further, the controller of the MFP 20 may have the same configuration as shown in FIG. 7. In the case of the MFP 20, an operations panel is provided as hardware corresponding to the display unit 106 and the input unit 107. Further, the MFP 20 includes hardware items specific to the image forming apparatus, such as a scanner (an image sensing part) and a plotter (a printing part).

A description is given below of an operational procedure of the license management system according to the embodiment of the present invention.

For example, a vender that develops and sells the SDK application 24 registers one or more licenses to be sold for the SDK application 24 with the license issuance site B before selling the SDK application 24. First, a description is given of processing in this case.

Figure 8:
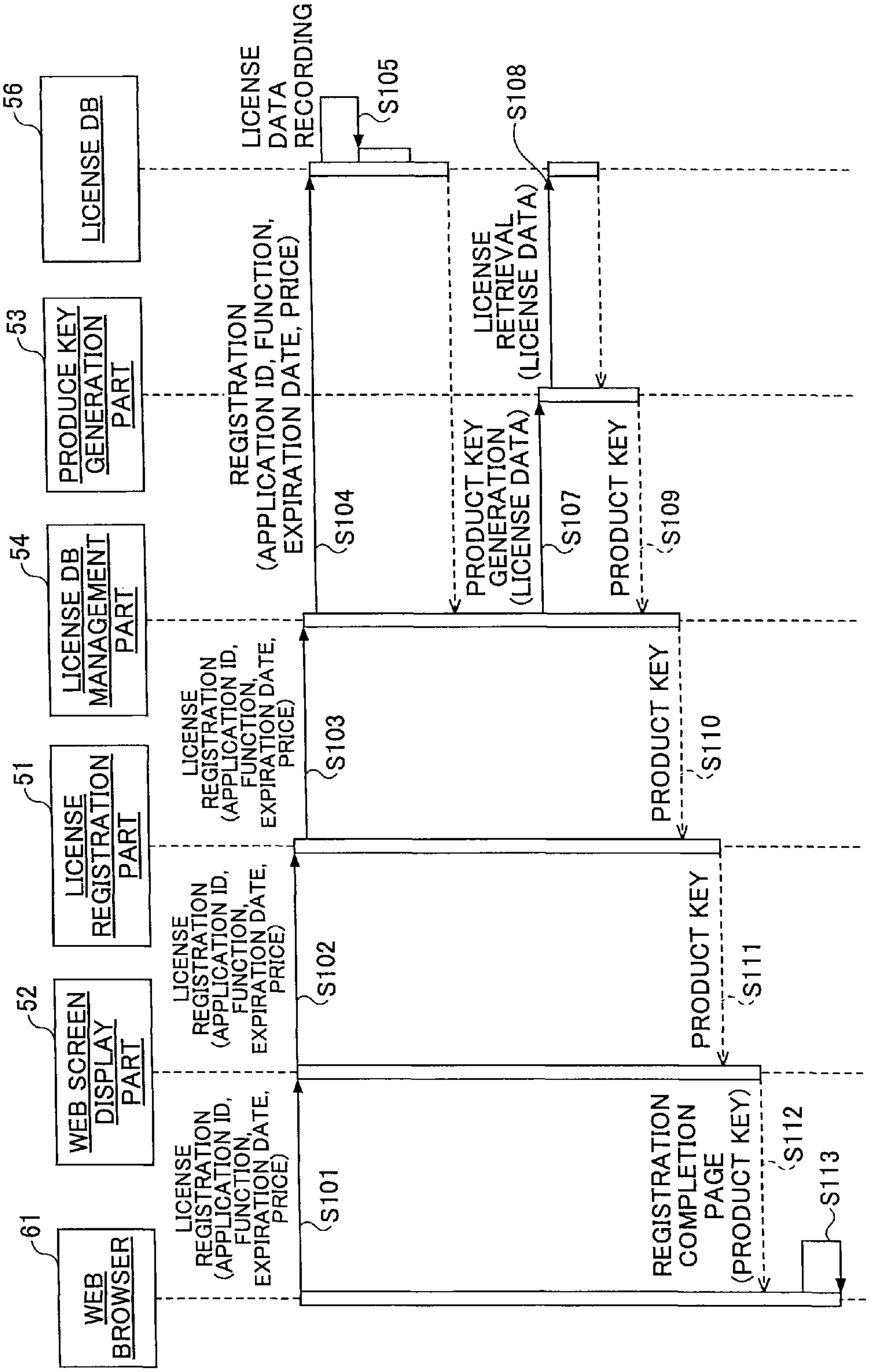
FIG. 8 is a sequence diagram for illustrating an operational procedure for license registration according to the embodiment of the present invention.

FIG. 8 is a sequence diagram for illustrating an operational procedure for license registration.

In FIG. 8, the initial state is assumed to be a state where a license registration screen (Web page) transmitted from the Web screen display part 52 of the license server 50 is displayed by a Web browser 61 of the license registration apparatus 60.

For example, in step S101, when the administrator in the license registration cite C enters registration information to be recorded of a license to be newly registered, such as an application ID preassigned to the SDK application 24 related to the license, one or more of all of the functions of the SDK application 24 whose usage is authorized under the license, the expiration date of the license, and the price of the license, the Web browser 61 transmits a license registration request including the registration information to the license server 50.

In step S102, receiving the license registration request, the Web screen display part 52 of the license server 50 notifies the license registration part 51 of the license registration request. In step S103, the license registration part 51 notifies the license DB management part 54 of the license registration request.

In step S104, the license DB management part requests the license DB 56 to record (register) the registration information. In step S105, the license DB 56 records the registration information, that is, the application ID, function, expiration date, and price of the license related to the registration request in the application license table 561 as a new record. (Hereinafter, this record is referred to as "current record.")

Next, in step S107, the license DB management part 54 specifies the registration information, and requests the product key generation part 53 to generate the product key of the license related to the registration request. In step S108, the product key generation part 53 generates a unique product key for the license (on a license-by-license basis) based on, for example, the application ID, function, expiration date, and price contained in the registration information, and records the product key in the current record of the application license table 561.

FIG. 9 shows an example of the application license table 561 updated by the registration of a new license. FIG. 9 shows the case where the last row is a current row. Thus, every time a license is registered, a record corresponding to the license is newly added to the application license table 561.

Next, in step S109, the product key generation part 53 outputs the generated product key to the license DB management part 54. In steps S110 and S111, the Web screen display part 52 is notified of the product key through the license registration part 51. In step S112, the Web screen display part 52 generates a Web page (license registration completion page) displaying a message that the license has been normally registered and the license key (product key), and returns the license registration completion page to the Web browser 61 as a response to the license registration request. In step S113, the Web browser 61 causes the license registration completion page to be displayed.

As a result, the administrator of the license registration site C can determine the license key for the registered license. The license key is attached to the SDK application 24 related to the license. That is, when the SDK application 24 circulates, the license key can be recognized where the SDK application 24 is obtained. Multiple types of licenses may be registered for the single SDK application 24. Accordingly, multiple license keys may be attached to the single SDK application 24.

Next, a description is given, with reference to drawings such as the sequence diagrams of FIG. 10, FIG. 12, FIG. 13, FIG. 19, and FIG. 24, of the purchase of a license and delivery of the purchased license to the MFP 20 executed by the license obtaining apparatus 10 after the SDK application 24 is acquired and installed in the MFP 20 in the user site A. The SDK application 24 is acquired by being downloaded in advance from a predetermined server, for example. The predetermined server may be a server for downloading an application managed in the license registration site C or the license issuance site B, or a server managed in a different site.

Figure 10:
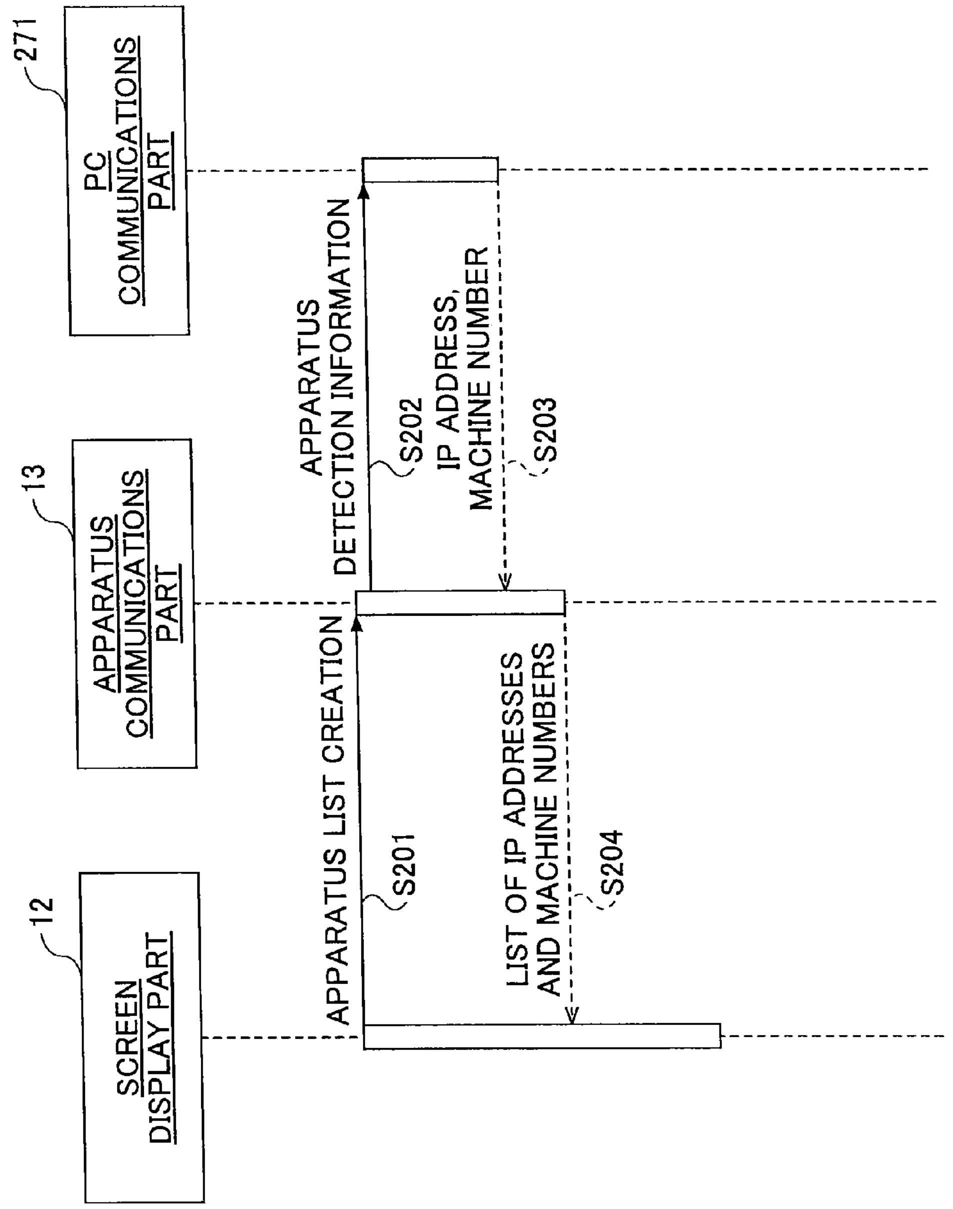
FIG. 10 is a sequence diagram for illustrating detection of the MFP by the license obtaining apparatus for the purchase of a license according to the embodiment of the present invention.

FIG. 10 is a sequence diagram for illustrating detection of the MFP 20 by the license obtaining apparatus 10 for the purchase of a license.

The processing of FIG. 10 is for the license obtaining apparatus 10 detecting the MFP 20 connected to the network 30 of the user site A.

In step S201, when an operator (for example, a serviceperson sent from the license issuance site B or the administrator in the user site A) enters an instruction to detect the MFP 20 through a screen displayed on the display unit 106 by the screen display part 12 of the license obtaining apparatus 10, the screen display part 12 requests the apparatus communications part 13 to create the list information of the MFPs 20 (an apparatus list). In step S202, the apparatus communications part 13 transmits information for detecting the MFP 20 (apparatus detection information) to the network 30. Although the apparatus detection information varies in accordance with various known protocols and communication methods, the protocol and the communications method are not limited to those predetermined in implementing the present invention. The transmission of the apparatus detection information may be issuance of a broadcast message.

In step S203, receiving the apparatus detection information, the PC communications part 271 of the MFP 20 returns the IP address and machine number of the MFP 20 to the license obtaining apparatus 10. Steps S202 and S203 are performed with respect to each MFP 20 connected to the network 30. Accordingly, each MFP 20 returns its IP address and machine number to the apparatus communications part 13 of the license obtaining part 10.

In step S204, receiving the IP address and machine number from each MFP 20, the apparatus communications part 13 puts the IP addresses and machine numbers together as list information (an apparatus list), and outputs the apparatus list to the screen display part 12. The screen display part 12 records and retains the apparatus list in the secondary storage unit 102 or the memory unit 103.

FIG. 11 shows an example of the apparatus list. As shown in FIG. 11, the screen display part 12 retains the IP addresses and machine numbers on an MFP-by-MFP basis.

Next, a description is given of processing where the license obtaining apparatus 10 acquires the list information of the SDK applications 24 (an application list) installed in the MFP 20 from each of the detected MFPs 20.

Figure 12:
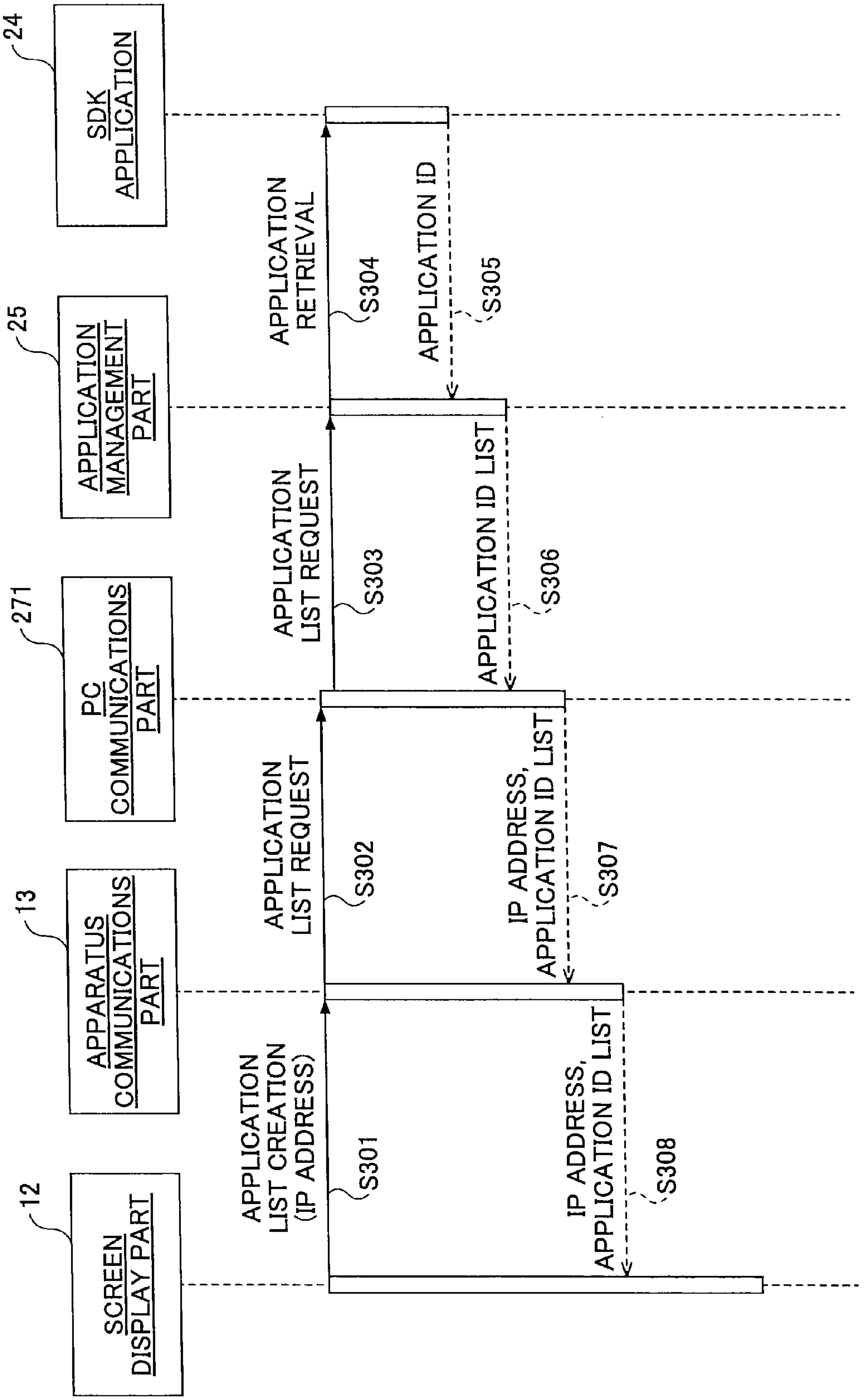
FIG. 12 is a sequence diagram for illustrating acquisition of the application list of each MFP by the license obtaining apparatus for the purchase of a license according to the embodiment of the present invention.

FIG. 12 is a sequence diagram for illustrating acquisition of the application list of each MFP 20 by the license obtaining apparatus 10 for the purchase of a license.

In step S301, the screen display part 12 specifies an IP address included in the retained apparatus list, and requests the apparatus communications part 13 to obtain the application list of the MFP 20 related to the specified IP address. In step S302, the apparatus communications part 13 requests the PC communications part 271 of the MFP 20 related to the specified IP address to provide the application list. In step S303, the PC communications part 271 requests the application management part 25 of the MFP 20 to obtain the application list.

In step S304, the application management part 25 retrieves the SDK applications 24 installed in the MFP 20. In step S305, the application management part 25 obtains the application ID from each of the retrieved SDK applications 24. Accordingly, if multiple SDK applications 24 are installed, multiple application IDs are obtained.

Next, in step S306, the application management part 24 outputs a list of the obtained application IDs (an application ID list) to the PC communications part 271. In step S307, the PC communications part 271 returns the application ID list to the license obtaining apparatus 10.

Next, in step S308, receiving the returned application ID list, the apparatus communications part 13 outputs the application ID list and the IP address of the MFP 20 that is the transmitter of the application ID list to the screen display part 12. The screen display part 12 records and retains the IP address and the application ID list in correlation to each other in the secondary storage unit 102 or the memory unit 103.

The processing of FIG. 12 may be automatically executed subsequent to the processing of FIG. 10. In this case, the processing of FIG. 12 may be repeated or executed in parallel with respect to all the MFPs 20 contained in the apparatus list. Alternatively, the screen display part 12 may cause a screen containing the apparatus list (an apparatus list screen) to be displayed on the display unit 106 after completion of the processing of FIG. 10, and the processing of FIG. 12 may be executed with respect to the MFP 20 selected on the apparatus list screen.

Next, a description is given of processing where the license obtaining apparatus 10 acquires the license status of each SDK application 24 whose application ID is included in the obtained application list.

Figure 13:
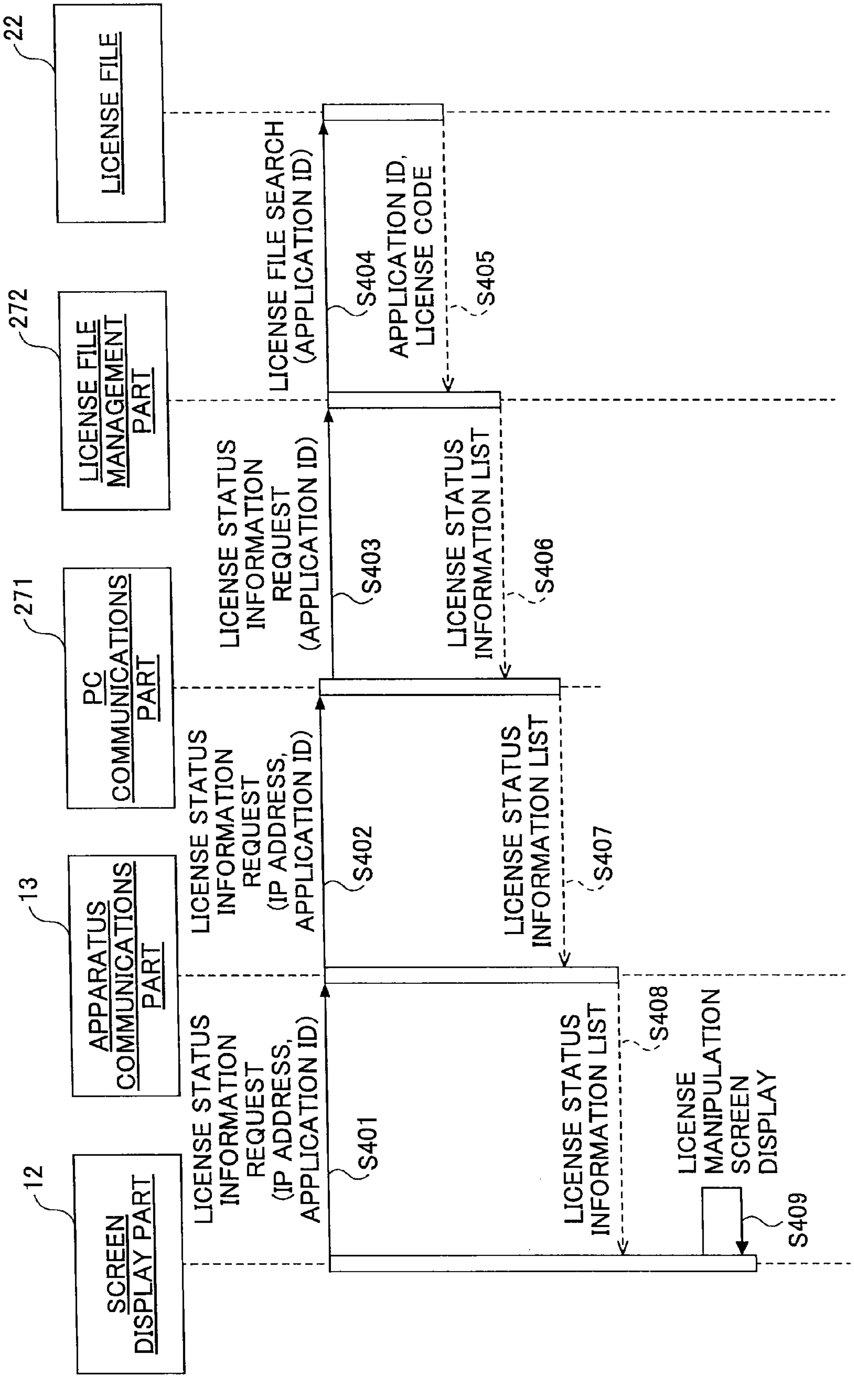
FIG. 13 is a sequence diagram for illustrating acquisition of the license status of each application by the license obtaining apparatus for the purchase of a license according to the embodiment of the present invention.

FIG. 13 is a sequence diagram for illustrating acquisition of the license status of each application by the license obtaining apparatus 10 for the purchase of a license.

In step S401, the screen display part 12 specifies the IP address of the MFP 20 retained therein and one or more application IDs correlated with the IP address, and requests the apparatus communications part 13 to obtain information indicating the license status (license status information) with respect to the SDK applications 24 related to the application IDs in the MFP 20 related to the IP address. In step S402, the apparatus communications part 13 specifies the application IDs and requests the PC communications part 271 of the MFP 20 related to the IP address to provide the license status information with respect to the specified application IDs.

In step S403, the PC communications part 271 specifies the application IDs, and requests the license file management part 272 of the MFP 20 to obtain the license status information with respect to the specified application IDs. In step S404, the license file management part 272 searches the license file 22 in the MFP 20 for license codes corresponding to the specified application IDs. In step S405, the license file management part 272 obtains the license codes.

FIG. 14 shows a configuration of the information stored in the license file 22. As shown in FIG. 14, the application ID and the license code are stored (recorded) in the license file 22 with respect to each of the SDK applications 24 installed in the MFP 20.

If multiple application IDs are specified, the license code is obtained for each application ID. However, no license code is recorded for an unlicensed SDK application 24 in the license file 22. Accordingly, the license code is not obtained with respect to the unlicensed SDK application 24, so that its value is, for example, NULL (blank).

Next, in step S406, the license file management part 272 outputs a list in which each specified application ID is paired (correlated) with its corresponding license code (NULL value for the unlicensed SDK application 24) (license status information list) to the PC communications part 271. The license status information list may have the same configuration as shown in FIG. 14. The license status information list may be a list of the application IDs of unlicensed SDK applications 24 (that is, the application IDs that have no license codes recorded in the license file 22). In this case, the license status information list represents a list of the unlicensed SDK applications 24. Next, in step S407, the PC communications part 271 returns the license status information list to the license obtaining apparatus 10.

In step S408, receiving the returned license status information list, the apparatus communications part 13 outputs the license status information list and the IP address of the MFP 20 that is the transmitter of the license status information list to the screen display part 12. The screen display part 12 records and retains the license status information in the secondary storage unit 102 or the memory unit 103 so that each of the application IDs retained in correlation with the IP address is correlated with its corresponding license status information.

FIG. 15 shows a configuration of the license status information retained in the license obtaining apparatus 10.

As shown in FIG. 15, the license code of the application ID is retained for each combination of the IP address of the MFP 20 and the application ID in the license obtaining apparatus 10. The value of the license code is retained as a NULL value (blank) with respect to the unlicensed SDK application 24. Accordingly, the license status of each SDK application 24 in each MFP 20 can be determined based on whether a license code is recorded for (correlated with) its application ID.

Next, in step S409, the screen display part 12 causes a screen for manipulating the license of each SDK application 24 (a license manipulation screen) to be displayed on the display unit 106 based on the license status information shown in FIG. 15.

Figure 16:
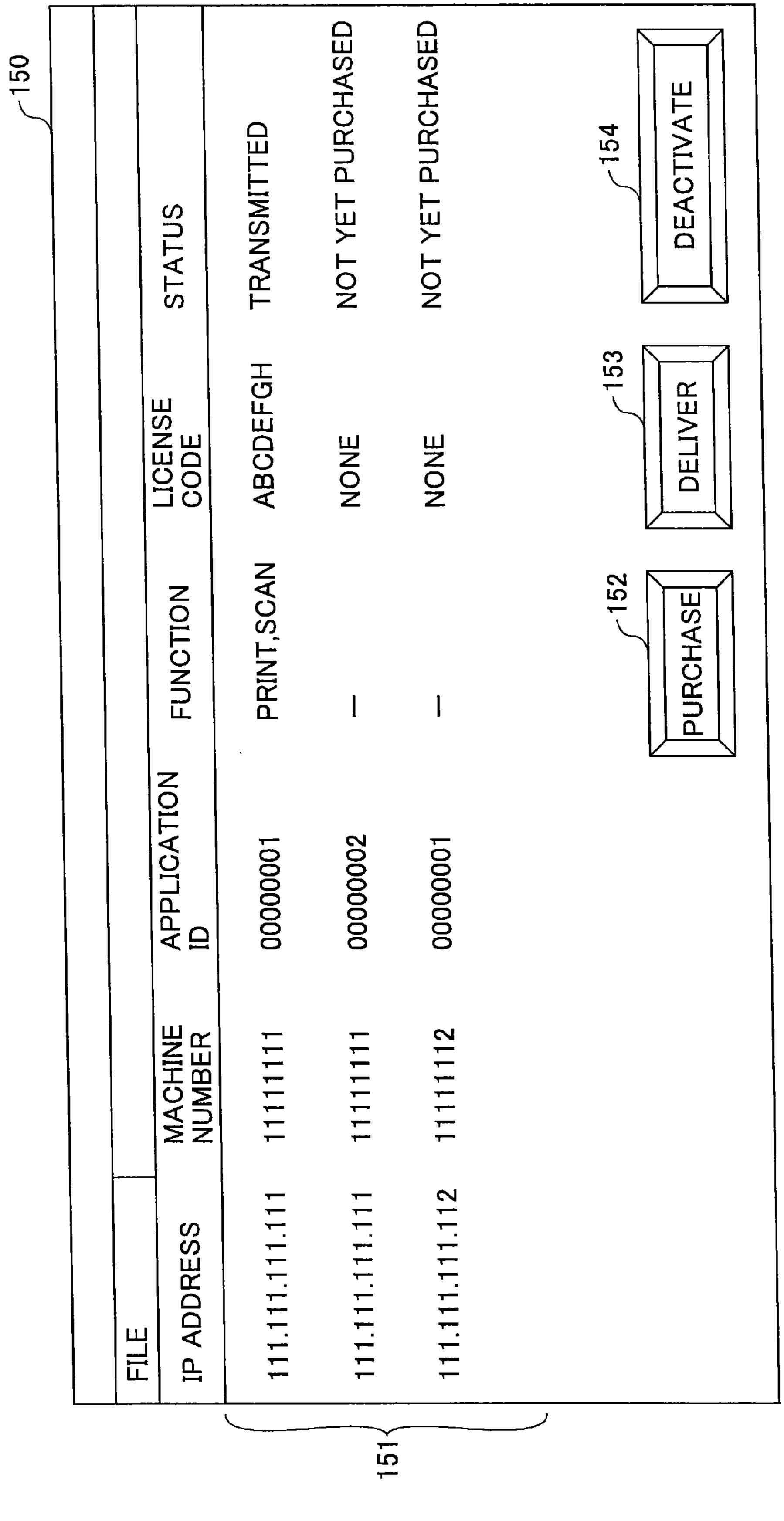
FIG. 16 is a diagram showing an example display of a license manipulation screen according to the embodiment of the present invention.

FIG. 16 is a diagram showing an example display of the license manipulation screen.

Referring to FIG. 16, a license manipulation screen 150 includes a list area 151, a PURCHASE button 152, a DELIVER button 153, and a DEACTIVATE button 154.

The list area 151 is where one or more functions licensed in the SDK application 24 related to the application ID, the license code for the SDK application 24, and the license status of the SDK application 24 are displayed for each combination of the IP address, the machine number, and the application ID based on the license status information.

The screen display part 12 displays the value of the license code in a corresponding field of the License Code column and displays TRANSMITTED in a corresponding field of the Status column with respect to each SDK application 24 whose license code has been obtained by the processing of FIG. 13. With respect to the SDK application whose license code has not been obtained, the screen display part 12 displays NONE in a corresponding field of the License Code column and displays NOT YET PURCHASED in a corresponding field of the Status column. The operator can check the status (presence or absence) of a license for each application installed in each MFP 20 on the license manipulation screen 150. Here, TRANSMITTED indicates that the license code, which is obtained by purchasing a license, has already been transmitted to the MFP 20.

Next, a description is given of processing for purchasing a license for the SDK application 24 for which it is determined on the license manipulation screen 150 that no license has been purchased.

When a row for the SDK application 24 for which a license is to be purchased is selected in the list area 151 of the license manipulation screen 150, the screen display part 12 highlights the selected row.

Figure 17:
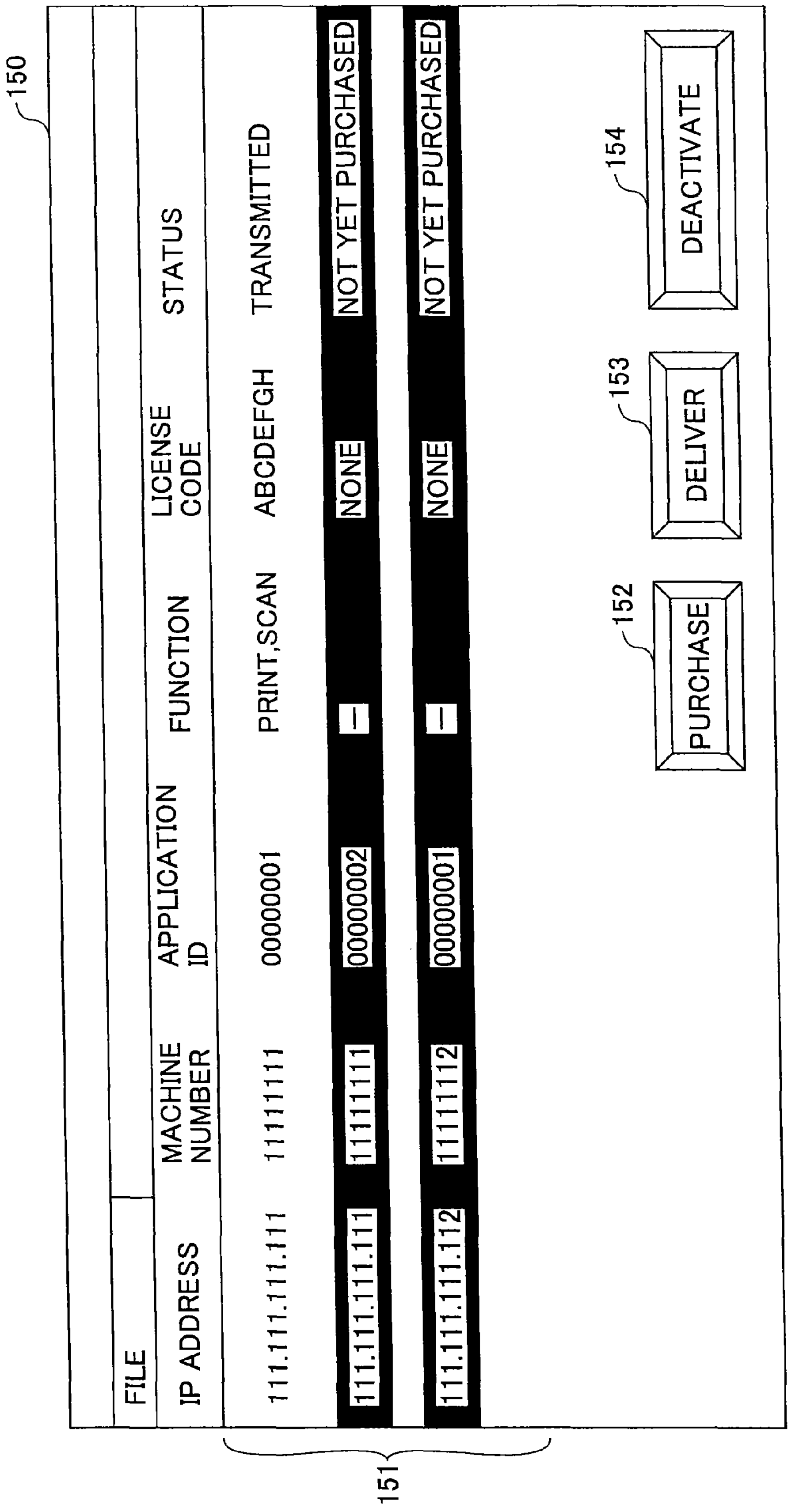
FIG. 17 is a diagram showing the license manipulation screen where a target of license purchase is selected according to the embodiment of the present invention.

FIG. 17 is a diagram showing the license manipulation screen 150 where a target of license purchase is selected.

FIG. 17 shows the condition where the second row and the third row are selected in the list area 151. That is, the SDK application 24 whose application ID is "00000002" in the MFP 20 whose machine number is "11111111" and the SDK application 24 whose application ID is "00000001" in the MFP 20 whose machine number is "11111112" are selected as targets of license purchase (that is, applications for which licenses are to be purchased). When the PURCHASE button 152 is clicked (selected) in this condition, the screen display part 12 causes a dialog box for entering the product key of a license to be purchased (a product key entry dialog box) to be displayed.

Figure 18:
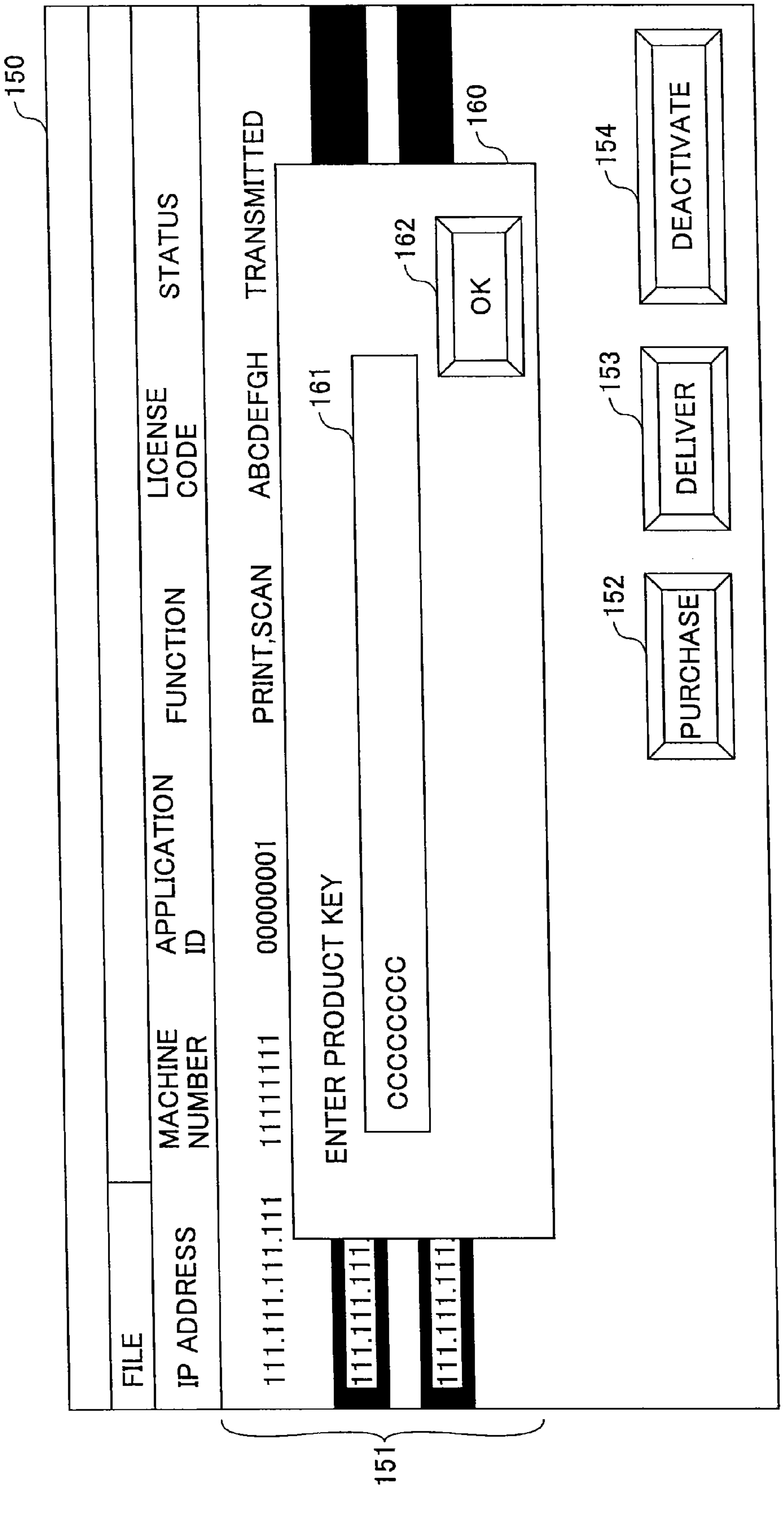
FIG. 18 is a diagram showing an example display of a product key entry dialog box according to the embodiment of the present invention.

FIG. 18 is a diagram showing an example display of the product key entry dialog box.

Figure 19:
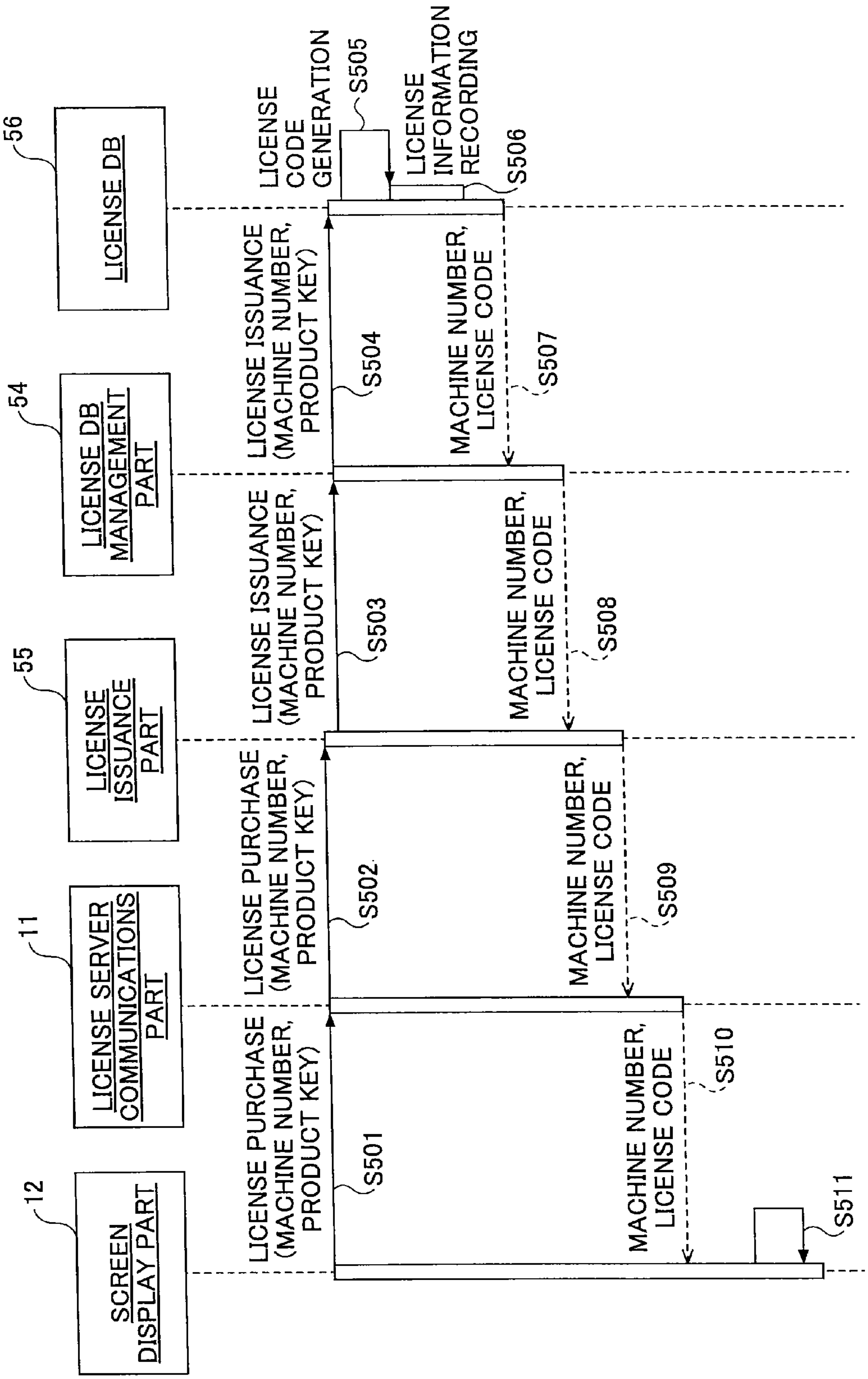
FIG. 19 is a sequence diagram for illustrating purchase of a license by the license obtaining apparatus according to the embodiment of the present invention.

Referring to FIG. 18, a product key entry dialog box 160 includes a text box 161 and an OK button 162. The text box 161 is an area for entering a product key. The operator enters a product key according to a necessary function (necessary functions) and expiration date. FIG. 18 shows the case where "CCCCCCCC" is entered as a product key. Here, when the OK button 162 is clicked, the product key entry dialog box 160 for entering a product key for the next SDK application 24 is displayed. When the product keys of all the SDK applications 24 determined as targets of license purchase have been entered, the processing shown in FIG. 19 is started. The product key entry dialog box 160 may be configured so as to allow the product keys of all the SDK applications 24 determined as targets of license purchase to be entered simultaneously in the single product key entry dialog box 160. Further, the product key entry dialog box 160 may also be configured to display a function (functions) to be licensed and an expiration date so as to make it possible to visually check them with ease with respect to each product key.

FIG. 19 is a sequence diagram for illustrating purchase of a license by the license obtaining apparatus 10.

In step S501, the screen display part 12 specifies the machine number related to each row selected on the license manipulation screen 150 and the product key entered for each row, and makes a request to purchase a license for each of the SDK applications 24 related to the product keys in the corresponding MFPs 20 related to the machine numbers to the license server communications part 11.

In step S502, the license server communications part 11 specifies the machine number and the product key, and makes a request to purchase a license to the license issuance part 55 of the license server 50. In step S503, the license issuance part 55 specifies the machine number and the product key, and requests the license DB management part 54 to issue a license. In step S504, the license DB management part 54 specifies the machine number and the product key, and requests the license DB 56 to issue a license. In step S505, the license DB 56 generates a license code based on the specified machine number and product key and the application license table 561 (FIG. 3).

FIG. 20 is a diagram showing a configuration of the license code.

As shown in FIG. 20, a single license code includes an application ID, the machine number of the MFP 20, an available function (available functions), and an expiration date. Based on the license code, usage of the SDK application 24 identified by the application ID is authorized in the MFP 20 identified by the machine number within the limits of the function(s) and expiration date specified in the license code. The values retrieved from the application license table 561 based on the product key specified to the license DB 56 are used for the application ID, function(s), and expiration date. The specified machine number is directly used as the machine number of the MFP 20. The license code is not a mere arrangement of the application ID, the machine number of the MFP 20, the available function(s), and the expiration date, but is generated by encoding and further encrypting these information items.

Next, in step S506, the license DB 56 records the machine number, the product key, and the license code in the license issuance table 562.

FIG. 21 shows the license issuance table 562 in which a new license is recorded.

In the license issuance table 562 of FIG. 21, the last two rows are added compared with its state of FIG. 3. That is, the row of a product key CCCCCCCC, a machine number 11111111, and a license code ABCDEFGI and the row of a product key BBBBBBBB, a machine number 11111112, and a license code ABCDEFHH are added.

Next, in step S507, the license DB 56 outputs the license code for the new license and the machine number to which the license code corresponds to the license DB management part 54. In steps S508 and S509, the license code and the machine number are transmitted to the license server communications part 11 of the license obtaining apparatus 10 through the license issuance part 55, and in step S510, are output from the license communications part 11 to the screen display part 12. The license code is generated for each combination of the machine number (MFP 20) and the product key (SDK application 24). Accordingly, when a license purchase instruction is given by selecting multiple rows on the license manipulation screen 150, multiple license codes are generated and issued for the machine numbers and product keys related to the multiple rows.

Receiving the machine number and the license code, the screen display part 12 updates the license status information retained in the license obtaining apparatus 10.

FIG. 22 shows the updated license status information. FIG. 22 shows that the newly issued license codes are added to the license status information of the second and third rows compared with the state of FIG. 15. The screen display part 12 makes it possible to identify an updated part of the license status information. For example, the flag information regarding the updated part may be set ON.

Next, in step S511, the screen display part 12 reflects the update of the license status information in the display contents of (or what is displayed on) the license manipulation screen 150.

Figure 23:
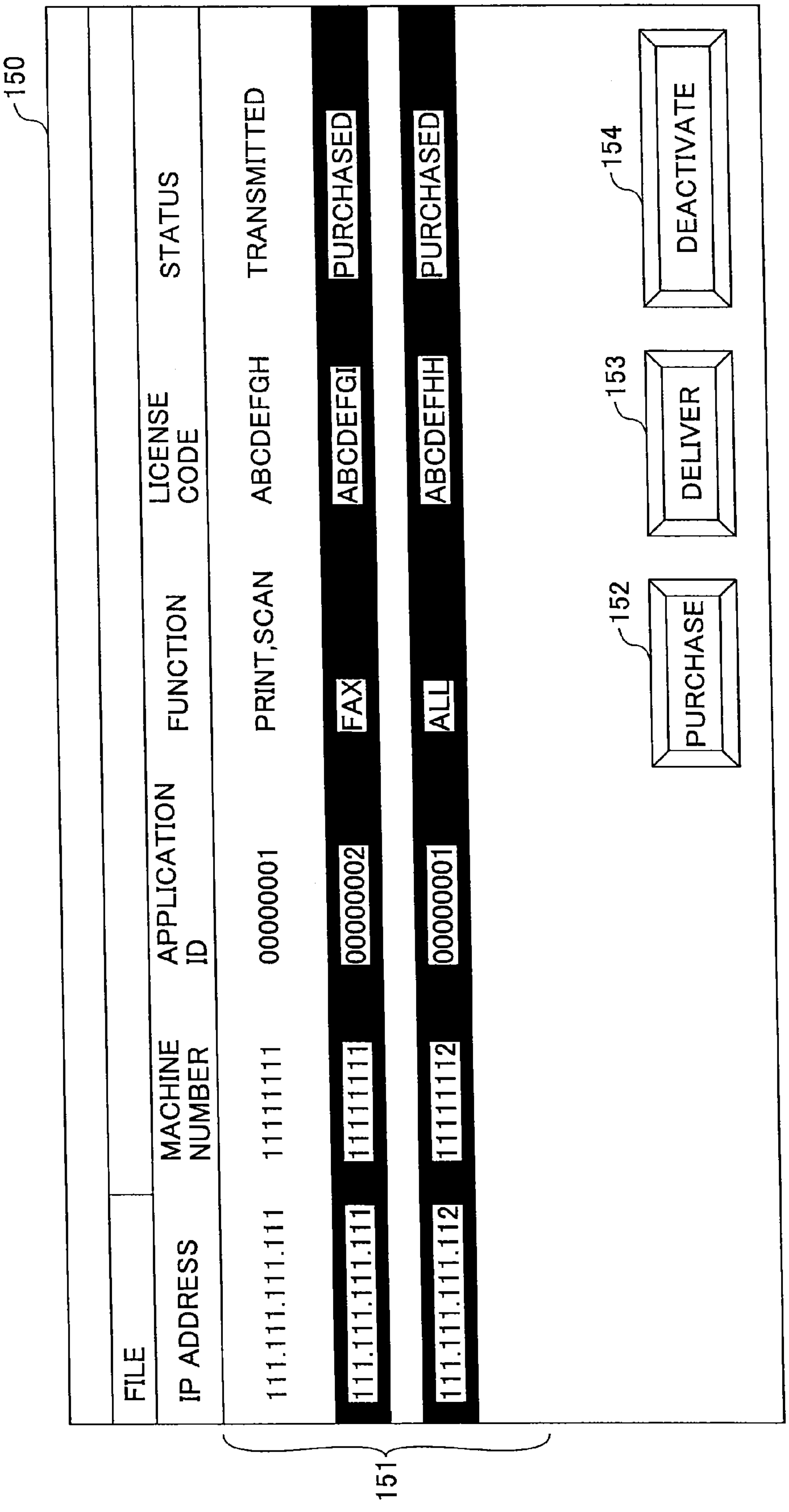
FIG. 23 is a diagram showing the license manipulation screen whose display contents are updated because of the purchase of a license according to the embodiment of the present invention.

FIG. 23 is a diagram showing the license manipulation screen 150 whose display contents are updated because of the purchase of a license.

Comparing FIG. 23 and FIG. 17, the issued license code is displayed and the status is updated (changed) to PURCHASED in each of the second and third rows on the license manipulation screen 150 shown in FIG. 23.

Figure 24:
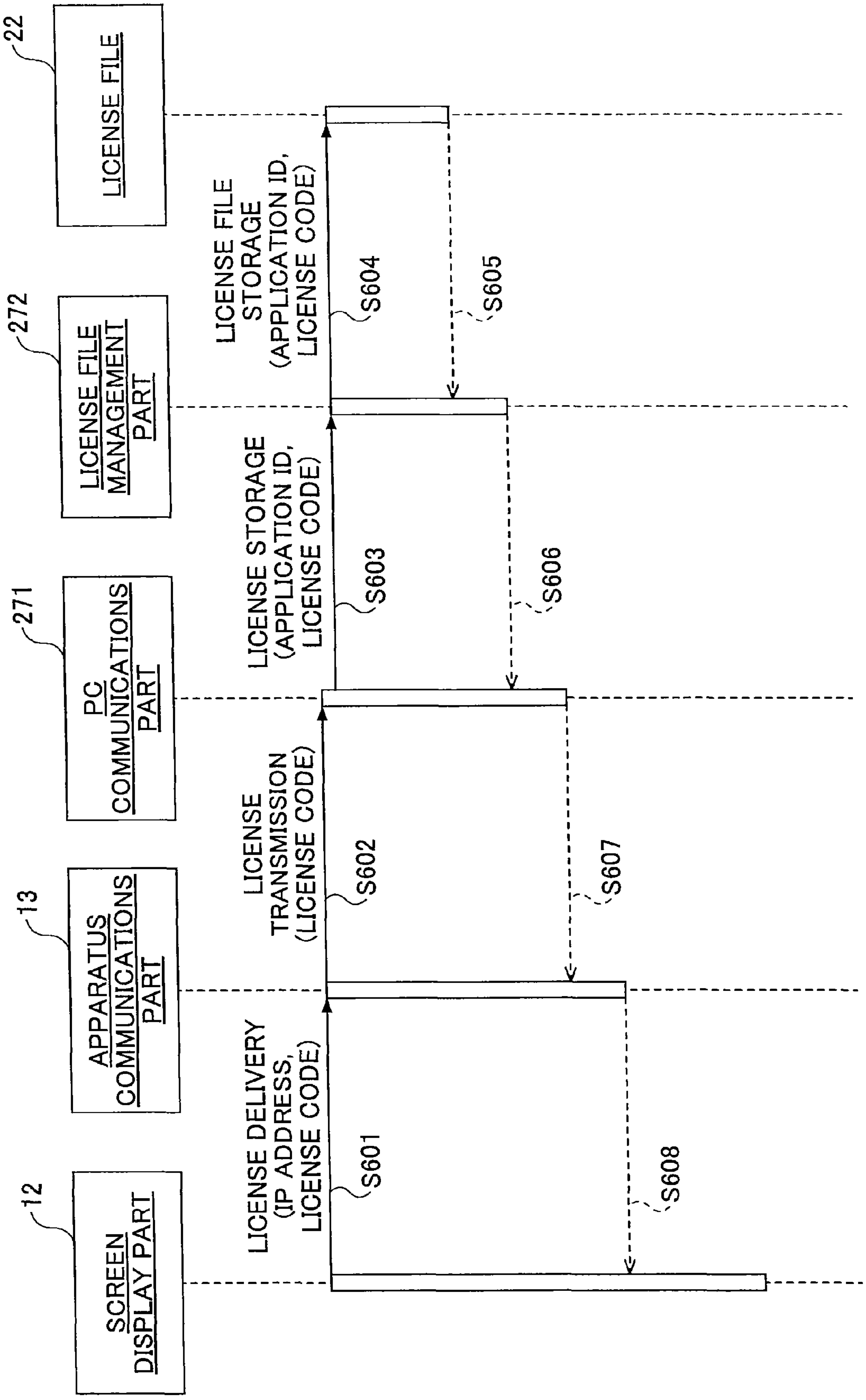
FIG. 24 is a sequence diagram for illustrating delivery of a license code by the license obtaining apparatus according to the embodiment of the present invention.

When an operator clicks the DELIVER button 153 with a row where the status is PURCHASED being selected, the processing of FIG. 24 is started. However, the processing of FIG. 24 may be started automatically upon acquisition of a license code.

FIG. 24 is a sequence diagram for illustrating delivery of a license code by the license obtaining apparatus 10.

In step S601, the screen display part 12 specifies the IP address and the license code related to a selected row on the license manipulation screen 150, and requests the apparatus communications part 13 to deliver a license to the IP address. In step S602, the apparatus communications part 13 transmits a corresponding license code to the PC communications part 271 of the MFP 20 related to the IP address. The PC communications part 271 extracts an application ID from the license code by decoding the license code using the license analysis library 28. In step S603, the PC communications part 271 specifies the extracted application ID and the license code, and requests the license file management part 272 of the MFP 20 to store the license code. In steps S604 and S605, the license file management part 272 records (stores) the license code in correlation with the specified application ID in the license file 22 of the MFP 20.

In step S606, when the license code is normally recorded, the license file management part 272 transmits a response indicating normal recording to the PC communications part 271. In steps S607 and S608, the notice of normal recording is transmitted to the screen display part 12 through the PC communications part 271 and the apparatus communications part 13. The screen display part 12 updates the display contents of the license manipulation screen 150 in response to the notice of normal recording.

Figure 25:
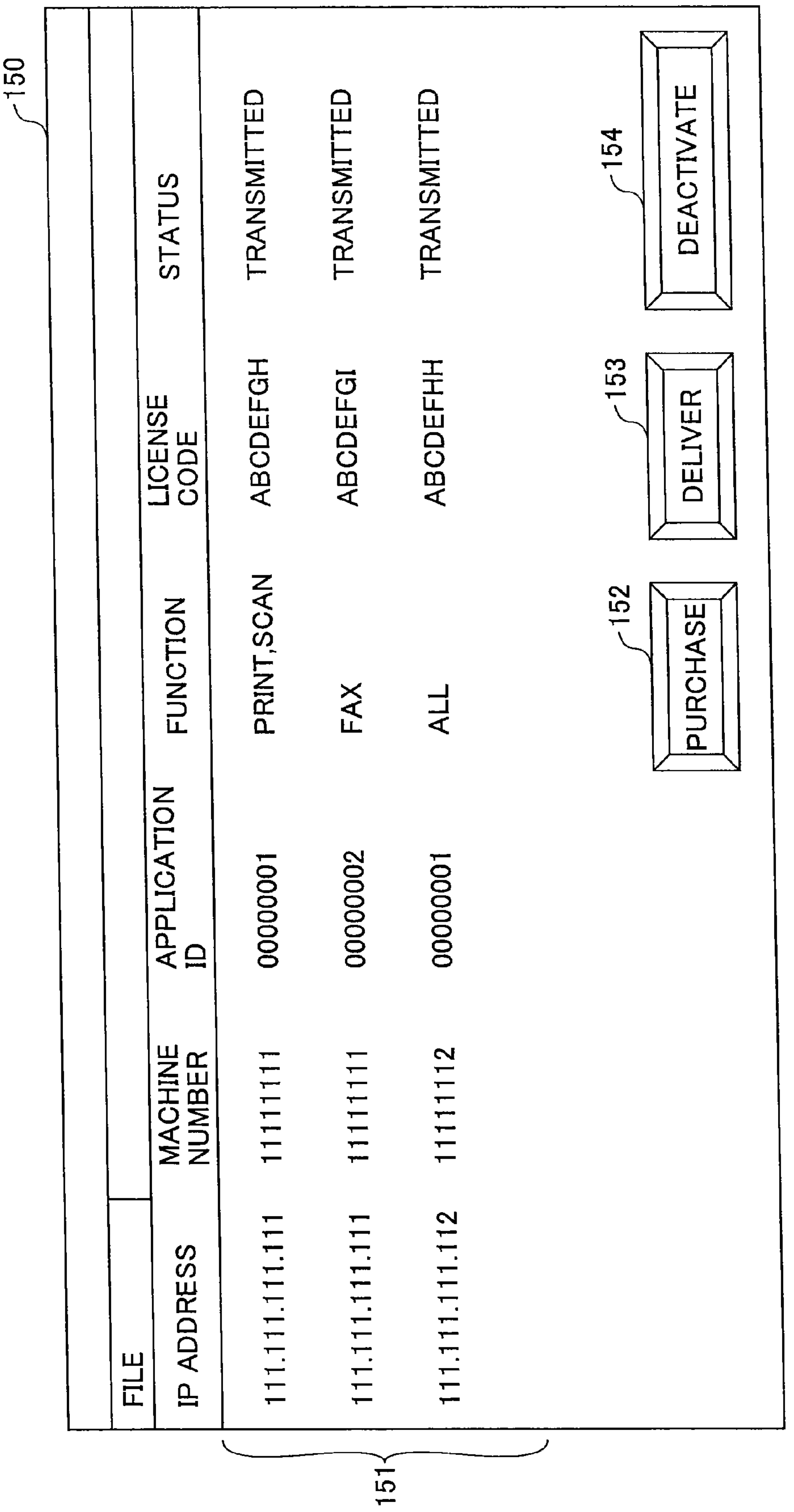
FIG. 25 is a diagram showing an example of the updated display contents of the license manipulation screen due to completion of delivery of a license according to the embodiment of the present invention.

FIG. 25 is a diagram showing an example of the updated display contents of the license manipulation screen 150 due to completion of delivery of a license.

FIG. 25 shows that the value in the field of the Status column of each of the second and third rows is updated to TRANSMITTED on the license manipulation screen 150. As a result, with respect to each of the rows, usage of the SDK application related to the application ID is authorized within the limits of the license in the MFP 20 related to the row.

If multiple rows are selected on the license manipulation screen 150, the processing of FIG. 24 is performed with respect to each of the rows. Accordingly, it is possible to simultaneously provide multiple MFPs 20 with respective licenses in a single operation.

By the way, when a row is selected in the list area 151 and the Property menu item of a File menu is selected on the license manipulation screen 150, the screen display part 12 causes the property dialog box of the license (license property dialog box) of the selected row to be displayed.

Figure 26:
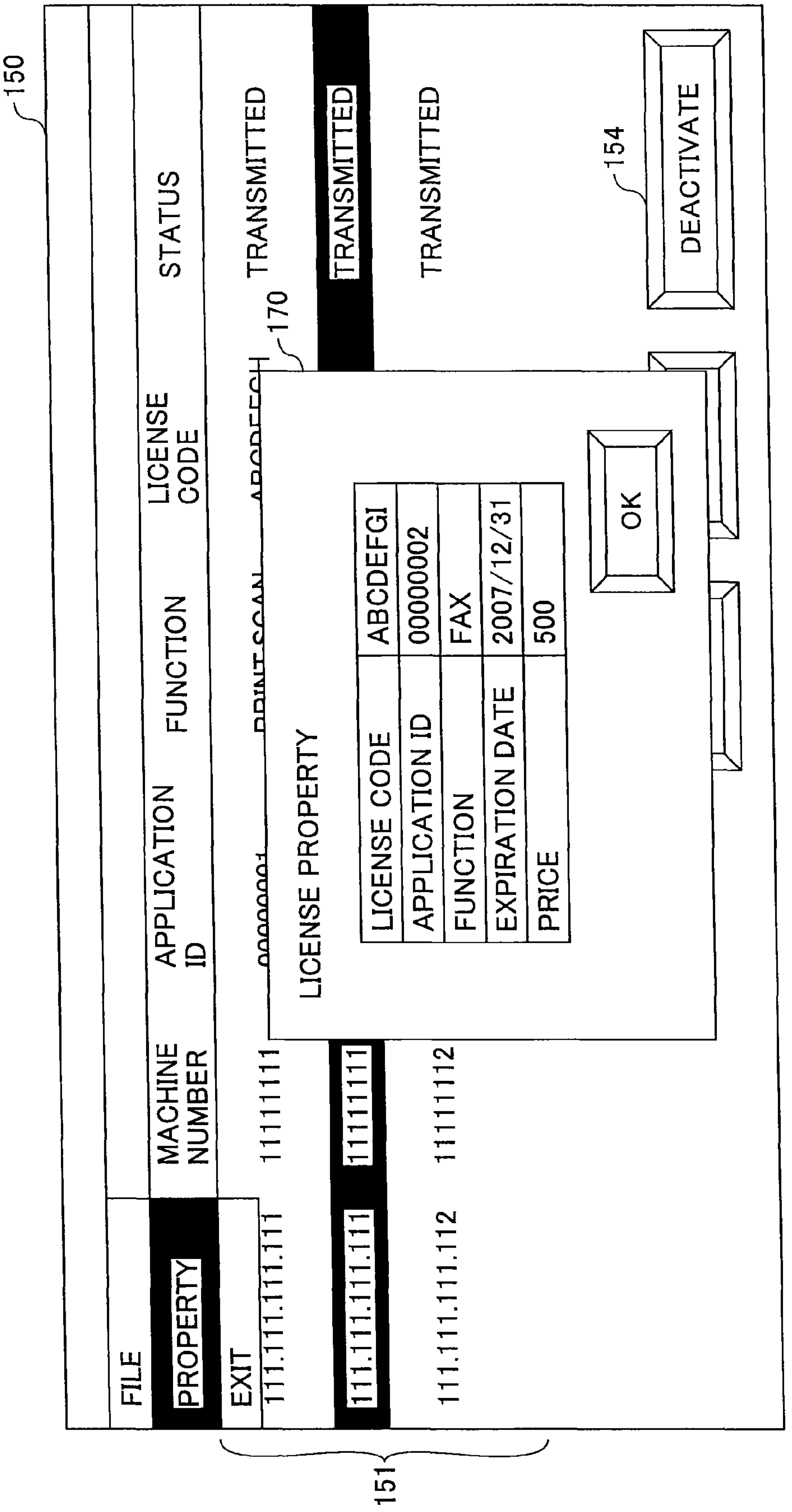
FIG. 26 is a diagram showing an example display of a license property dialog box according to the embodiment of the present invention.

FIG. 26 is a diagram showing an example display of the license property dialog box.

As shown in FIG. 26, the properties (license code, application ID, function(s), expiration date, price, etc.) of the license selected on the license manipulation screen 150 are displayed in a license property dialog box 170. The license property dialog box 170 is displayed so as to allow a user to check more detailed information on the license. The information displayed in the license property dialog box 170 may be obtained by the screen display part 12 decrypting and decoding the license code.

Next, a description is given of processing in the case where a request to use the SDK application 24 is made in the MFP 20.

Figure 27:
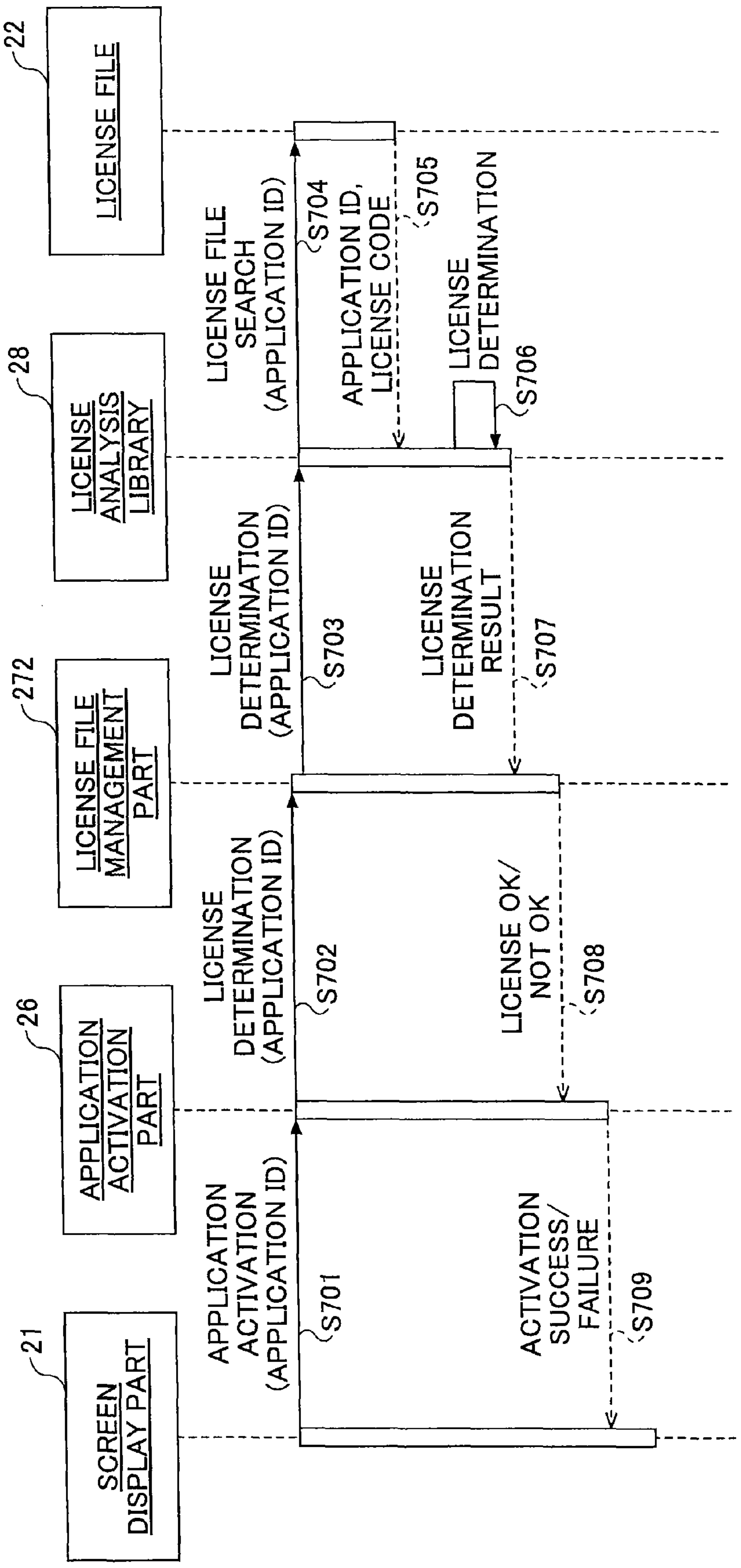
FIG. 27 is a sequence diagram for illustrating activation of an SDK application in the MFP according to the embodiment of the present invention.

FIG. 27 is a sequence diagram for illustrating activation of the SDK application 24 in the MFP 20.

As an initial state in FIG. 27, the screen display part 21 causes a list of the SDK applications 24 installed in the MFP 20 to be displayed on the operations panel. When a user selects a desired one of the SDK applications 24 and gives an instruction to execute it, in step S701, the screen display part 21 specifies the application ID of the selected SDK applications 24, and requests the application activation part 26 to activate the SDK application.

In step S702, the application activation part 26 specifies the application ID, and requests the license file management part 272 to perform determination as to whether there is a license for the SDK application 24 (hereinafter simply referred to as "license determination").

In step S703, the license file management part 272 specifies the application ID, and requests the license analysis library 28 to perform license determination. In step S704, the license analysis library 28 searches the license file 22, and in step S705, obtains a license code stored in correlation with the application ID.

Next, in step S706, the license analysis library 28 determines the presence or absence of a license for (or the availability of) the SDK application 24 related to the application ID based on the license code. Specifically, the license analysis library 28 decrypts and thereafter decodes the license code, and obtains an application ID, a machine number, and an expiration date contained in the license code. Then, the license analysis library 28 compares the machine number and the application ID obtained from the license code with the machine number of the MFP 20 and the application ID related to the activation instruction, respectively. If the machine numbers match each other, the application IDs match each other, and it is before the expiration date, the license analysis library 28 determines the presence of a license. On the other hand, if the machine numbers or the application IDs do not match each other, or it is not before the expiration date, the license analysis library 28 determines the absence of a license. If a license code corresponding to the application ID is not obtained in step S705, the license analysis library 28 determines there is no license for the SDK application.

In step S707, the result of the determination by the license analysis library 28 is output to the license file management part 272. In step S708, the license file management part 272 notifies the application activation part 26 of the presence or absence of a license based on the determination result. If there is a license, in step S709, the application activation part 26 activates the SDK application 24 whose activation has been requested, and notifies the screen display part 31 of successful activation. On the other hand, if there is no license, in step S709, the application activation part 26 does not activate the SDK application 24 whose activation has been requested, and notifies the screen display part 31 of activation failure. In the case of successful activation of the SDK application 24, the screen display part 21 causes a manipulation screen for the SDK application to be displayed on the operations panel. In the case of activation failure, the screen display part 21 causes an error screen to be displayed on the operations panel.

Next, a description is given of processing in the case of canceling or making invalid (deactivating) the license of the SDK application 24.

Figure 28:
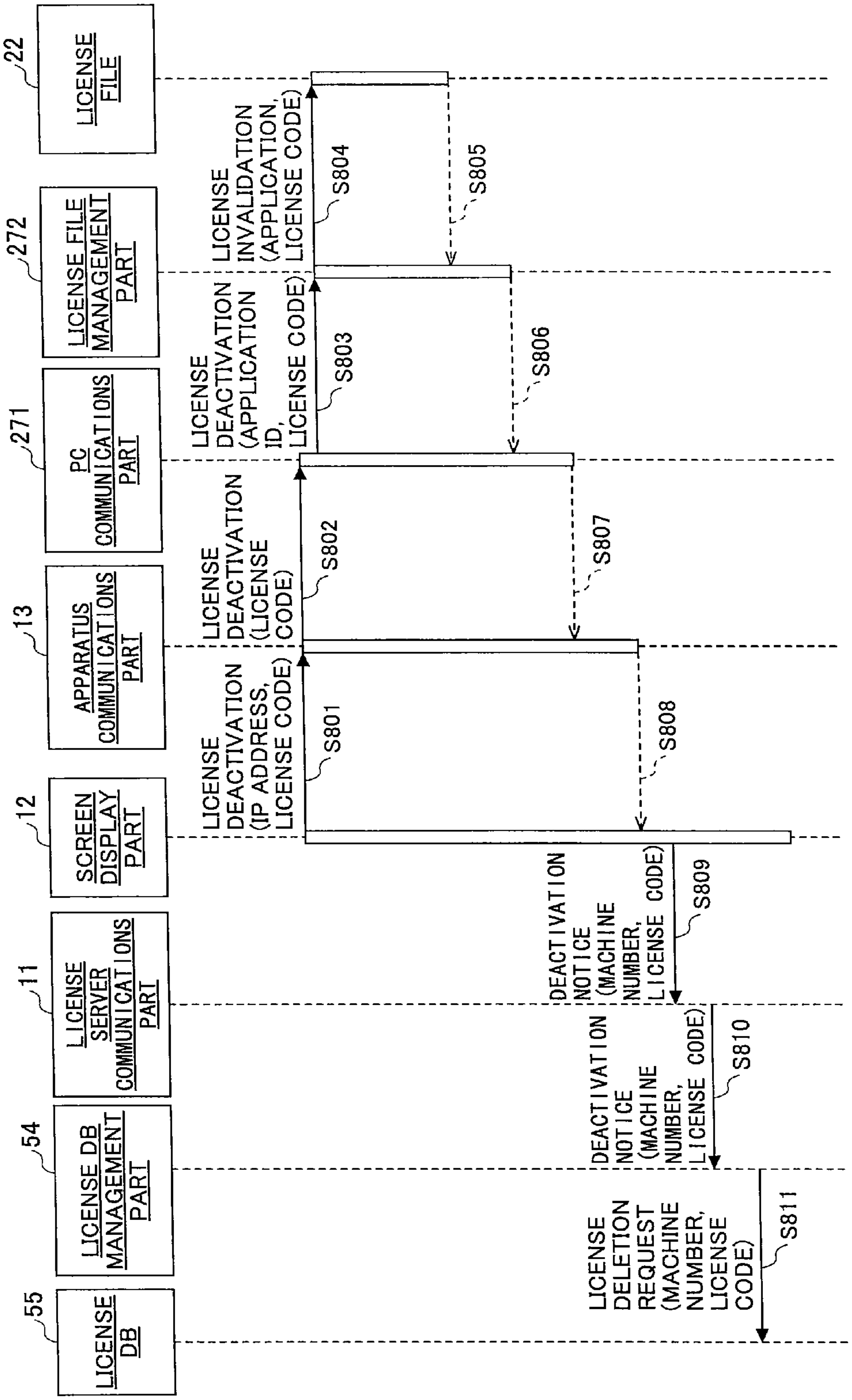
FIG. 28 is a sequence diagram for illustrating deactivation according to the embodiment of the present invention.

FIG. 28 is a sequence diagram for illustrating deactivation.

For example, when an operator clicks the DEACTIVATE button 154 with a row where the status is TRANSMITTED being selected on the license manipulation screen 150, the processing of FIG. 28 is started.

In step S801, the screen display part 12 specifies the IP address and the license code related to a selected row on the license manipulation screen 150, and requests the apparatus communications part 13 to deactivate a license with respect to the MFP 20 related to the IP address. In step S802, the apparatus communications part 13 specifies the license code and transmits a request to deactivate a license to the PC communications part 271 of the MFP 20.

In step S803, the PC communications part 271 extracts an application ID from the license code by decoding the license code using the license analysis library 28. The PC communications part 271 specifies the extracted application ID and the license code, and requests the license file management part 272 of the MFP 20 to deactivate the license. In steps S804 and S805, the license file management part 272 makes the license invalid by deleting a recorded license code from the license file 22 of the MFP 20 with respect to the specified application ID. Alternatively, the license may be made invalid by recording flag information (a deactivation flag) indicating that the license has been deactivated in the license file 22 instead of deleting the license code.

FIG. 29 shows an example of the license file 22 containing a deactivation flag.

In the license file 22 shown in FIG. 29, the deactivation flag is correlated with a license code. In FIG. 29, "circle" indicates that the license has been deactivated.

When the license has been normally deactivated, in step S806, the license file management part 272 transmits a response indicating completion of deactivation to the PC communications part 271. In steps S807 and S808, this notice of completion of deactivation is transmitted to the screen display part 12 through the PC communications part 271 and the apparatus communications part 13. Next, in step S809, the screen display part 12 specifies the machine number and the license code related to the deactivated license, and requests the license server communications part 11 to notify the license server 50 of the deactivation. In step S810, the license server communications part 11 specifies the machine number and the license code, and notifies the license DB management part 54 of the license server 50 that the license has been deactivated.

In step S811, the license DB management part 54 specifies the machine number and the license code, and requests the license DB 56 to delete the license. The license DB 56 deletes a record matching the specified machine number and license code from the license issuance table 562 (FIG. 4). Alternatively, flag information indicating that the license has been deactivated may also be recorded in the license issuance table 562 instead of deleting the record the same as in the license file 22.

Deactivation of a license is effective in the case of transferring a purchased license to another MFP 20. That is, if a license is deactivated in an MFP 20, usage of the SDK application 24 based on the license is not authorized in the MFP 20. However, transmitting the license to another MFP 20 makes it possible to use a function corresponding to the license in the other MFP 20.

By the way, the price of a license may be displayed on the license manipulation screen 150.

Figure 30:
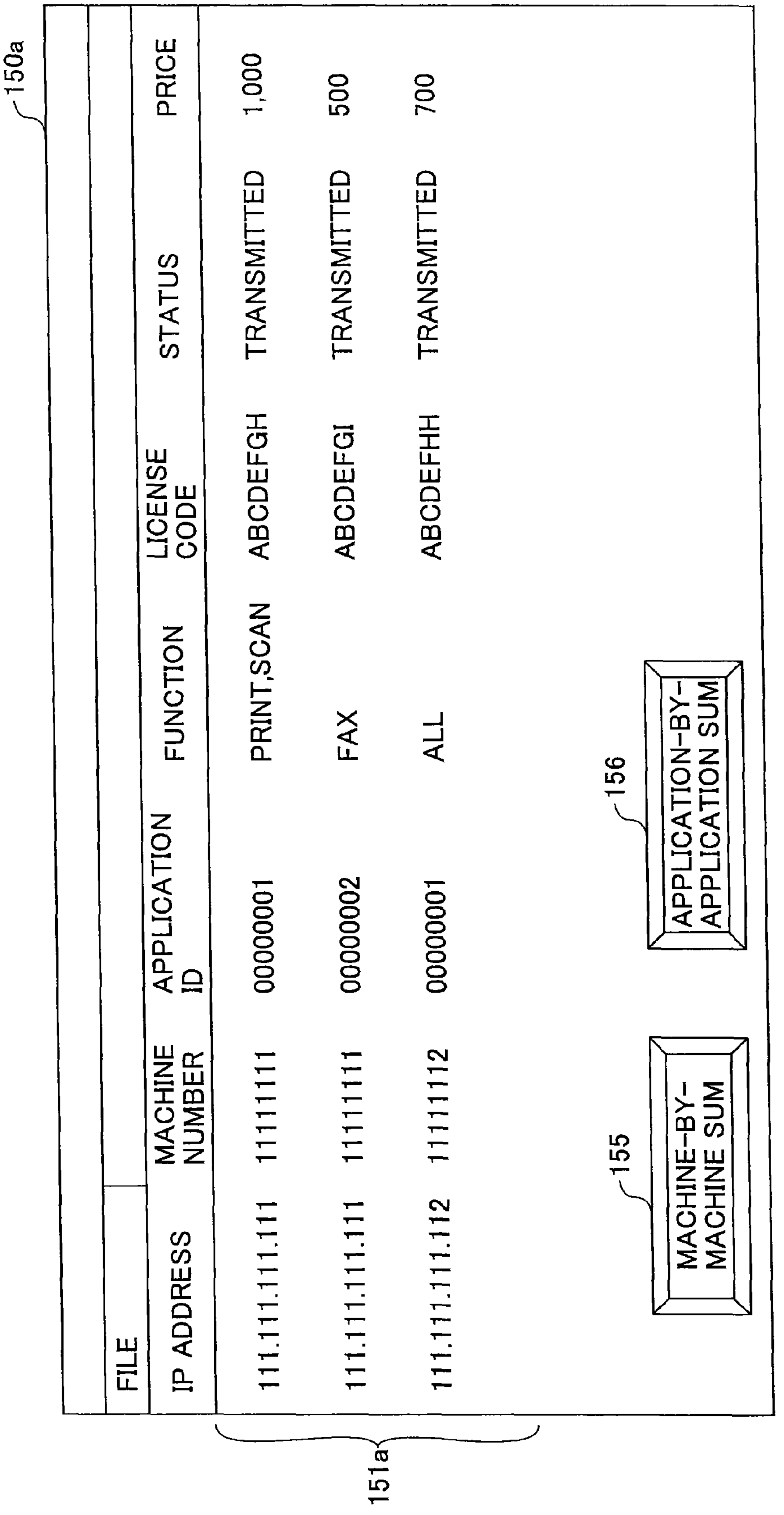
FIG. 30 is a diagram showing an example display of a license manipulation screen that allows budget management according to the embodiment of the present invention.

FIG. 30 is a diagram showing an example display of a license manipulation screen 150*a* that allows budget management.

The price of each license is displayed in a list display area 151*a* of the license manipulation screen 150*a* of FIG. 30. The budget management part (FIG. 5) of the license obtaining apparatus 10 obtains the price from a license code by decrypting and decoding the license code, and causes the price to be displayed. Displaying the price of each license makes it possible to properly help purchase a license matching a budget (that is, perform budget management).

The license manipulation screen 150*a* includes a MACHINE-BY-MACHINE SUM button 155 and an APPLICATION-BY-APPLICATION SUM button 156. In response to clicking on the MACHINE-BY-MACHINE SUM button 155, the budget management part 14 calculates the total value of the prices of the licenses purchased in the MFP 20 with respect to each MFP 20 (machine), that is, on an MFP-by-MFP (machine-by-machine) basis, and causes the calculation results to be displayed on the license manipulation screen 150*a*.

Figure 31:
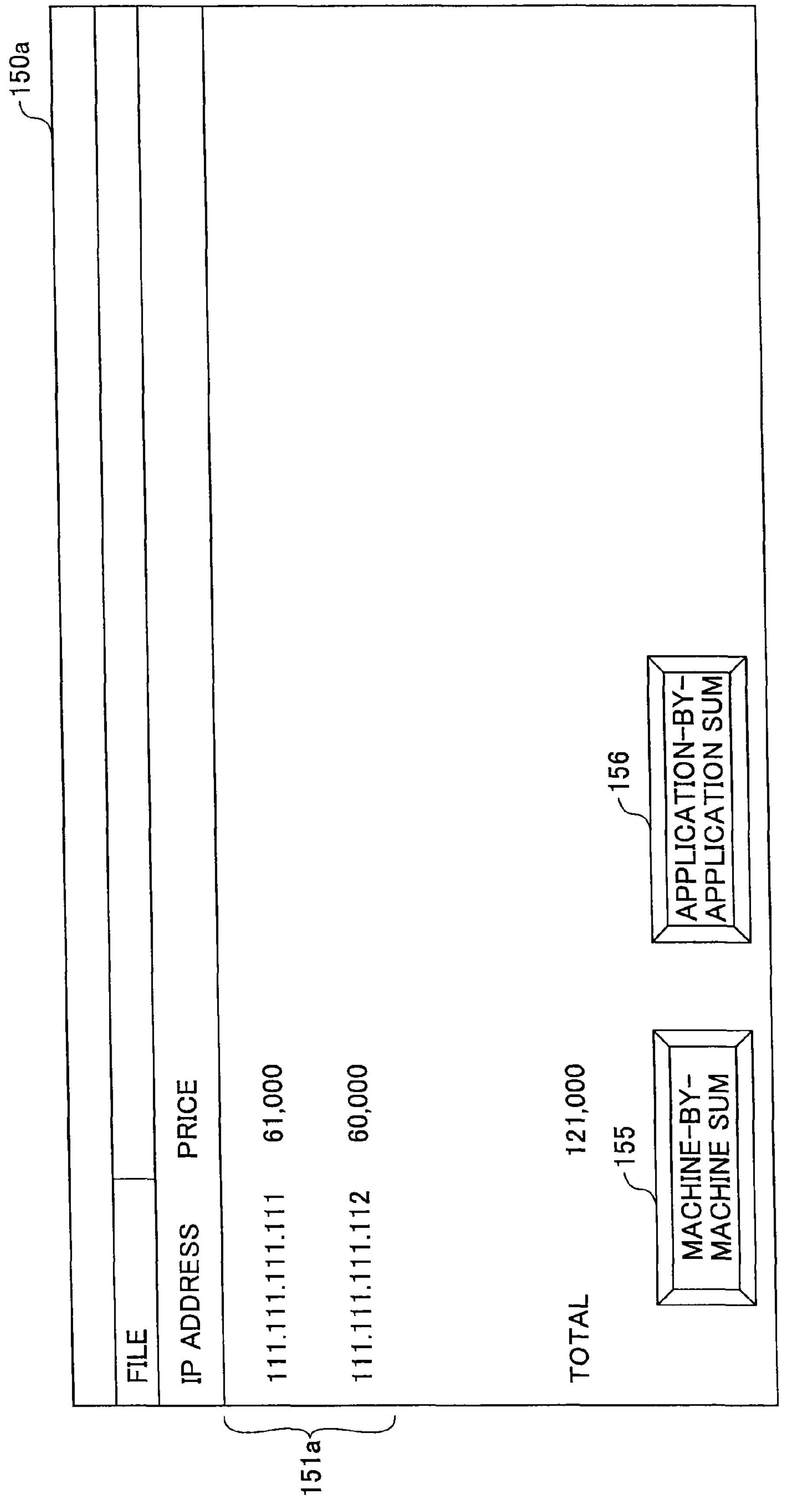
FIG. 31 is a diagram showing an example display of the license manipulation screen where the total value of license prices is displayed for each machine according to the embodiment of the present invention.

FIG. 31 is a diagram showing an example display of the license manipulation screen 150*a* where the total value of license prices is displayed for each machine.

Referring to FIG. 31, the total value of the prices of purchased licenses is displayed with respect to each machine (MFP 20) in the list display area 151*a* of the license manipulation screen 150*a*. Further, the total value of the license prices of all MFPs 20 (¥121,000) is also displayed.

In response to clicking on the APPLICATION-BY-APPLICATION SUM button 156 on the license manipulation screen 150*a*, the budget management part 14 calculates the total value of the prices of purchased licenses with respect to each SDK application 24 over multiple MFPs 20, and causes the calculation results to be displayed on the license manipulation screen 150*a*.

Figure 32:
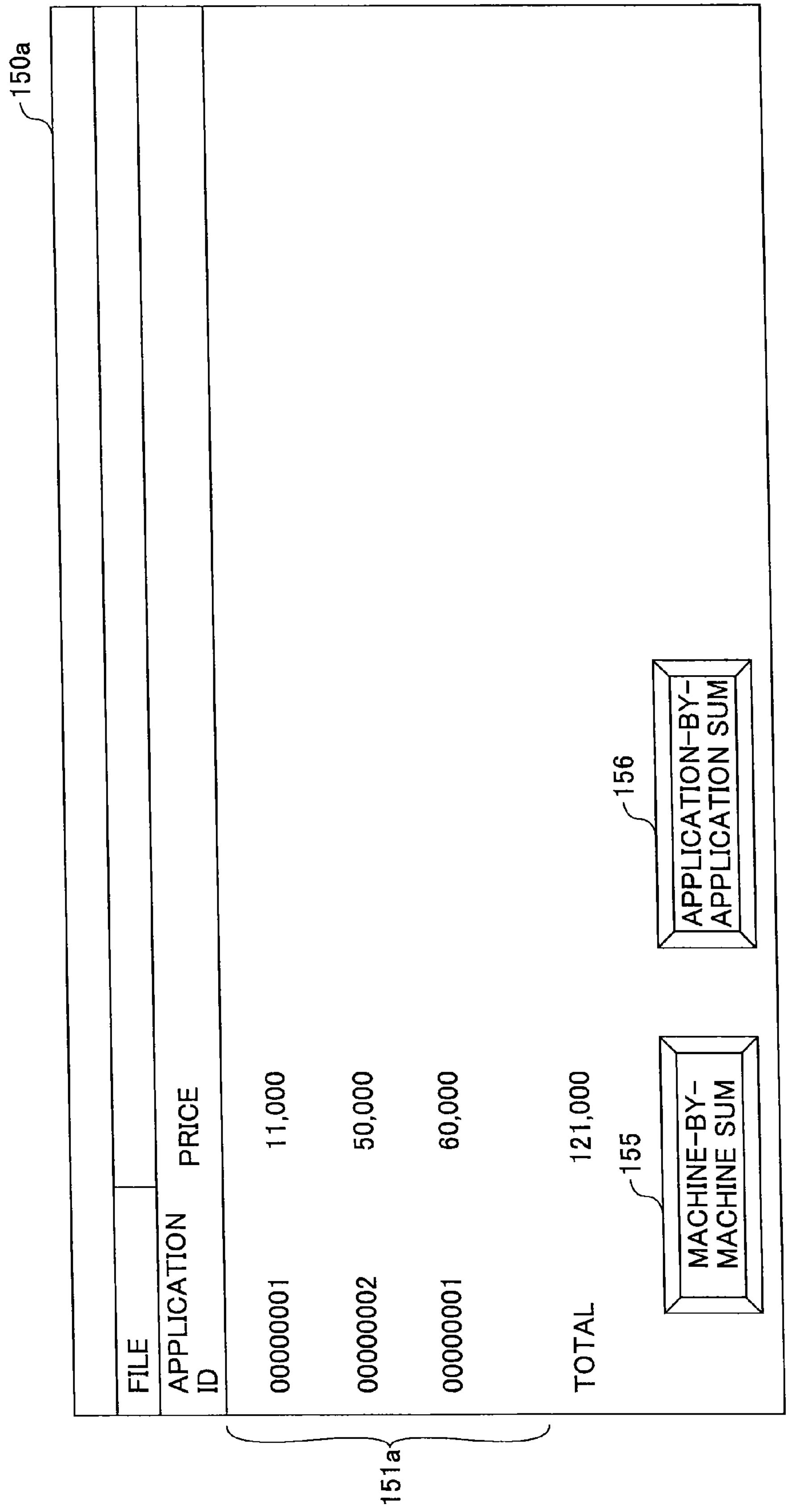
FIG. 32 is a diagram showing an example display of the license manipulation screen where the total value of license prices is displayed for each application according to the embodiment of the present invention.

FIG. 32 is a diagram showing an example display of the license manipulation screen 150*a* where the total value of license prices is displayed for each application.

Referring to FIG. 32, the total value of the prices of purchased licenses is displayed with respect to each SDK application 24 (application ID) in the list display area 151*a* of the license manipulation screen 150*a*. Further, the total value of the license prices of all SDK applications 24 (¥121,000) is also displayed.

The budget management part 14 may not always have to be implemented in the license obtaining apparatus 10.

Figure 33:
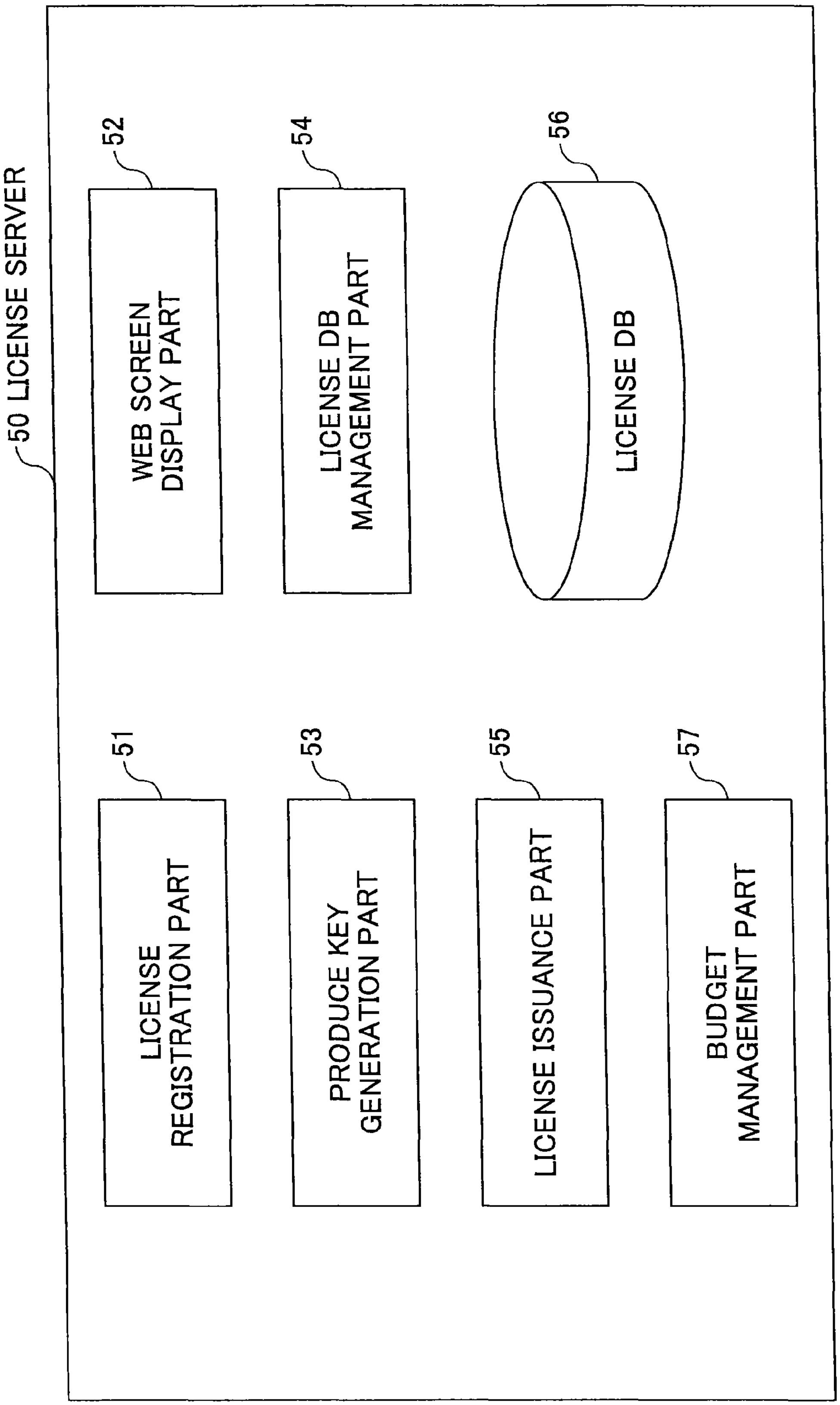
FIG. 33 is a block diagram showing a functional configuration of the license server including a budget management part according to the embodiment of the present invention.

FIG. 33 is a block diagram showing a functional configuration of the license server 50 including a budget management part 57.

Referring to FIG. 33, the budget management part 57 of the license server 50 calculates the total value of license prices with respect to each machine or each SDK application 24 based on the license issuance table 562, and provides the license obtaining apparatus 10 with the calculation results.

Figure 34:
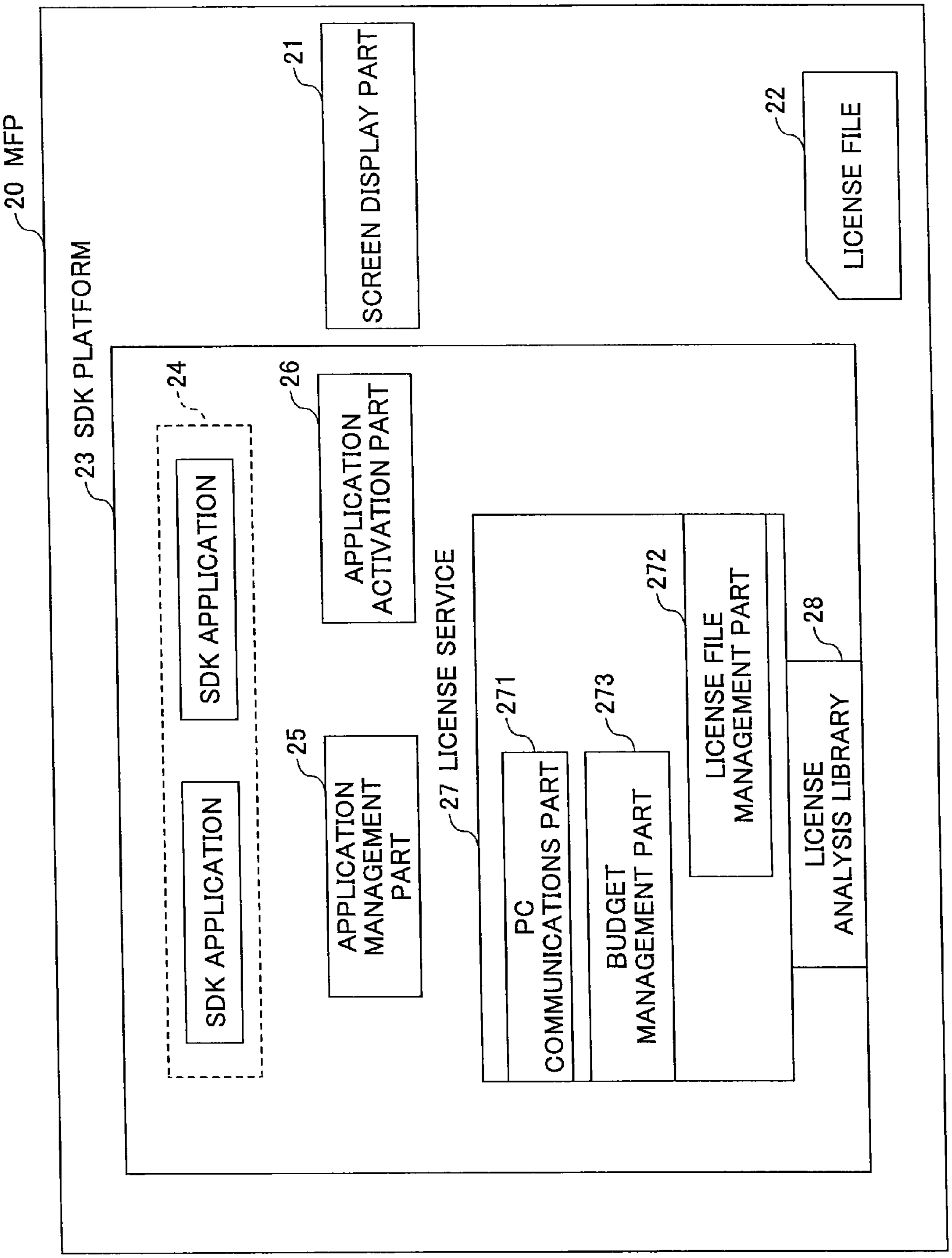
FIG. 34 is a block diagram showing a functional configuration of the MFP including a budget management part according to the embodiment of the present invention.

FIG. 34 is a block diagram showing a functional configuration of the MFP 20 including a budget management part 273.

Referring to FIG. 34, the budget management part 273 of the MFP 20 calculates the total value of license prices with respect to each machine or each SDK application 24 based on information included in the license codes contained in the license file 22, and provides the license obtaining apparatus 10 with the calculation results.

In the above-described embodiment, the license registration function and the license issuance function are implemented in the license server 50. Alternatively, these functions may be implemented in the license obtaining apparatus 10.

Figure 35:
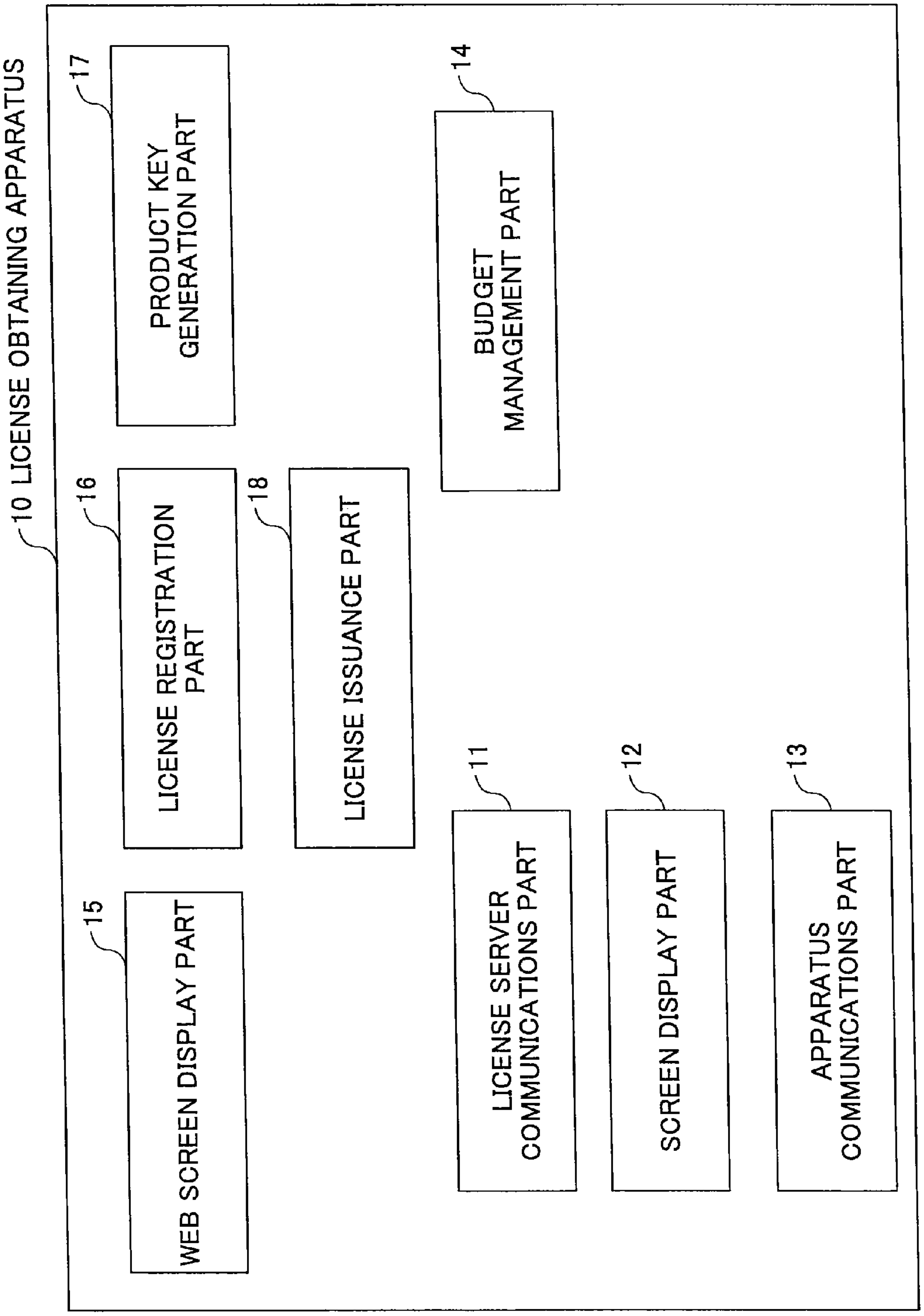
FIG. 35 is a diagram showing a functional configuration of the license obtaining apparatus including a license registration function and a license issuance function according to the embodiment of the present invention.

FIG. 35 is a diagram showing a functional configuration of the license obtaining apparatus 10 including a license registration function and a license issuance function.

Compared with the configuration shown in FIG. 5, the license obtaining apparatus 10 additionally includes a Web screen display part 15, a license registration part 16, a product key generation part 17, and a license issuance part 18, which implement the same functions as the Web screen display part 52, the license registration part 51, the product key generation part 53, and the license issuance part 55, respectively, of the license server 50. Accordingly, in this case, it is possible that at least the license DB management part 54 and the license DB 56 are implemented in the license server 50.

Figure 36:
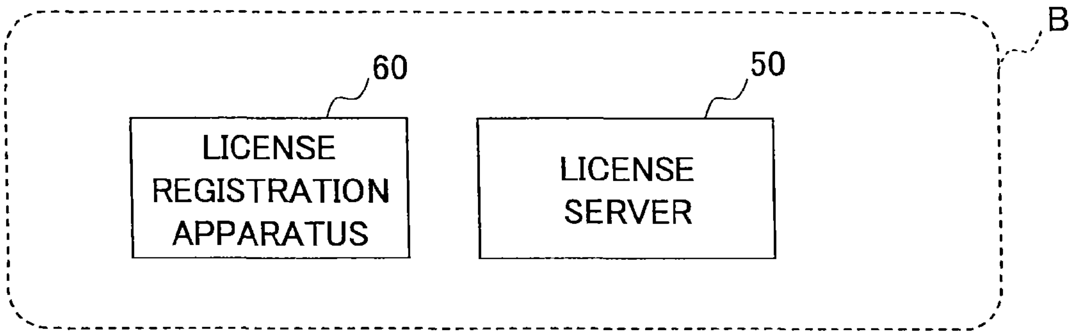
FIG. 36 is a block diagram showing a case where a license registration apparatus is provided in a license issuance site according to the embodiment of the present invention.

FIG. 36 is a block diagram showing a case where the license registration apparatus 60 is provided in the license issuance site B.

As shown in FIG. 36, the license registration apparatus 60 may be provided in the license issuance site B. This is because the SDK application 24 can also be developed by the manufacturer of the MFP 20. In this case, the license server 50 and the license registration apparatus 60 may be a single computer.

As described above, according to the license management system according to this embodiment, the license obtaining apparatus 10 can obtain all licenses for multiple MFPs 20 and deliver them to the corresponding MFPs 20. Accordingly, it is possible to set up a license on each MFP 20 with efficiency.

Further, since there is no need for each MFP 20 to directly access the license server 50, no MFP 20 has to be directly connected to a wide area network such as the Internet. Accordingly, it is possible to ensure higher security for the MFP 20.

The present invention is not limited to the specifically disclosed embodiment, and variations and modifications may be made without departing from the scope of the present invention.

The present application is based on Japanese Priority Patent Applications No. 2007-050667, filed on Feb. 28, 2007, No. 2007-050668, filed on Feb. 28, 2007, No. 2007-295661, filed on Nov. 14, 2007, and No. 2007-295662, filed on Nov. 14, 2007, the entire contents of which are hereby incorporated by reference.

What is claimed is:

1. An information processing system, comprising:

a plurality of apparatuses each configured to install a plurality of applications thereon; and an information processor connected to each of the apparatuses via a first network, wherein each of the apparatuses includes:

memory configured to record correlated identification information of installed applications and any first information issued to the applications that authorizes usage of the applications in the apparatus; and a determination processing portion configured to determine whether to authorize usage of one of the installed applications based on the first information, which is included in second information, in response to a request for usage of said one of the installed applications, and wherein the information processor is configured to:

for each of the apparatuses, obtain the second information, which is stored in the memory of the apparatus, by communication with the apparatus, display a list of the second information, identify, based on the presence or absence of the first information in the second information, an application of the plurality of applications installed in each of the plurality of apparatuses, said application being selected from the displayed list of the second information, and for which the first information has not been issued in the second information, request issuance of the first information for the identified application by specifying apparatus information indicating an apparatus of the plurality in which the identified application is installed, obtain the first information, issued in response to the issuance request, from a computer connected to the information processor via a second network different from the first network, and update the second information stored in the memory of said apparatus specified by the apparatus information by transmitting the obtained first information to said apparatus specified by the apparatus information, wherein the information processor separates each of the apparatuses from the computer via the first network and the second network, respectively.

2. The information processing system as claimed in claim 1, wherein the first information includes information indicating an available function of the application pertaining to application identification information included in the first information, and information indicating an expiration date of the first information.

3. The information processing system as claimed in claim 2, wherein the first information includes a plurality of license data defined for the same application, the license data being different from each other in the available function.

4. The information processing system as claimed in claim 1, wherein the information processor is configured to specify license identification information of a license for the application and obtain the first information corresponding to the license identification information, the license identification information being determined on a license basis.

5. The information processing system as claimed in claim 4, wherein the license identification information assigned to licenses for the same application differs between the licenses depending on an available function of the application or an expiration date of the license.

6. The information processing system as claimed in claim 1, wherein the first information is license data, and the second information is a license file that includes the first information.

7. The information processing system as claimed in claim 6, wherein the license data includes one or more license codes and one or more corresponding application IDs.

8. An information processing method executed by a plurality of apparatuses, each configured to install a plurality of applications thereon, and an information processor connected to the apparatuses via a first network, the information processing method comprising:

for each of the apparatuses, recording, using memory of the apparatus, correlated identification information of installed applications and any first information issued to the applications that authorizes usage of the applications in the apparatus;

for each of the apparatuses, determining, using the apparatus, whether to authorize usage of one of the installed applications based on the first information, which is included in second information, in response to a request for usage of said one of the installed applications;

for each of the apparatuses, obtaining, using the information processor, the second information, which is stored in the memory of the apparatus, by communication between the information processor and the apparatus;

displaying, using the information processor, a list of the second information;

identifying, using the information processor, based on the presence or absence of the first information in the second information, an application of the plurality of applications installed in each of the plurality of apparatuses, said application being selected from the displayed list of the second information, and for which the first information has not been issued in the second information;

requesting, using the information processor, issuance of the first information for the identified application by specifying apparatus information indicating an apparatus of the plurality in which the identified application is installed;

obtaining, using the information processor, the first information, issued in response to said issuance requesting, from a computer connected to the information processor via a second network different from the first network; and updating, using the information processor, the second information stored in the memory of said apparatus specified by the apparatus information by transmitting the obtained first information to said apparatus specified by the apparatus information, wherein the information processor separates each of the apparatuses from the computer via the first network and the second network, respectively.

9. The information processing method as claimed in claim 8, wherein the first information includes information indicating an available function of the application pertaining to application identification information included in the first information, and information indicating an expiration date of the first information.

10. The information processing method as claimed in claim 9, wherein the first information includes a plurality of license data defined for the same application, the license data being different from each other in the available function.

11. The information processing method as claimed in claim 8, wherein said obtaining specifies license identification information of a license for the application and obtains the first information corresponding to the license identification information, the license identification information being determined on a license basis.

12. An information processor connected to a plurality of apparatuses, each capable of installing a plurality of applications thereon, via a first network, each of the apparatuses including memory configured to record correlated identification information of installed applications and any first information issued to the applications that authorizes usage of the applications in the apparatus, and a determination processing portion configured to determine whether to authorize usage of one of the installed applications based on the first information, which is included in second information, in response to a request for usage of said one of the installed applications, the information processor comprising:

a hardware processor configured to:

for each of the apparatuses, obtain the second information, which is stored in the memory of the apparatus, by communication with the apparatus, display a list of the second information, identify, based on the presence or absence of the first information in the second information, an application of the plurality of applications installed in each of the plurality of apparatuses, said application being selected from the displayed list of the second information, and for which the first information has not been issued in the second information, request issuance of the first information for the identified application by specifying apparatus information indicating an apparatus of the plurality in which the identified application is installed, obtain the first information, issued in response to the issuance request, from a computer connected to the information processor via a second network different from the first network, and update the second information stored in the memory of said apparatus specified by the apparatus information by transmitting the obtained first information to said apparatus specified by the apparatus information, wherein the information processor separates each of the apparatuses from the computer via the first network and the second network, respectively.

13. The information processor as claimed in claim 12, wherein the first information includes information indicating an available function of the application pertaining to application identification information included in the first information, and information indicating an expiration date of the first information.

14. The information processor as claimed in claim 13, wherein the first information includes a plurality of license data defined for the same application, the license data being different from each other in the available function.

15. The information processor as claimed in claim 12, wherein the hardware processor is configured to specify license identification information of a license for the application and obtain the first information corresponding to the license identification information, the license identification information being determined on a license basis.

16. An apparatus, of a plurality of apparatuses, capable of installing a plurality of applications thereon that is connectable to an information processor, along with the other apparatuses of the plurality, via a first network, the apparatus comprising:

memory, which is configured to record correlated identification information of the installed applications and any first information issued to the applications that authorizes usage of the applications in the apparatus; and a processor configured to determine whether to authorize usage of one of the installed applications based on the first information, which is included in second information, in response to a request for usage of said one of the installed applications, wherein the apparatus is separated from a computer by the information processor via the first network and the second network, respectively, and wherein the information processor is configured to obtain the second information, which is stored in the memory of the apparatus, by communication with the apparatus; display a list of the second information; identify, based on the presence or absence of the first information in the second information, an application of the plurality of applications installed in the apparatus, said application being selected from the displayed list of the second information, and for which the first information has not been issued in the second information; request issuance of the first information for the identified application by specifying apparatus information indicating the apparatus, of the plurality of apparatuses connected to the information processor via the first network, as the apparatus in which the identified application is installed; obtain the first information, issued in response to the issuance request, from the computer connected to the information processor via a second network different from the first network; and update the second information stored in the memory of said apparatus specified by the apparatus information by transmitting the obtained first information to said apparatus.

17. The apparatus as claimed in claim 16, wherein the first information includes information indicating an available function of the application pertaining to application identification information included in the first information, and information indicating an expiration date of the first information.

18. The apparatus as claimed in claim 17, wherein the first information includes a plurality of license data defined for the same application, the license data being different from each other in the available function.

* * * * *